US011584519B2

(12) United States Patent
Smith et al.

(10) Patent No.: US 11,584,519 B2
(45) Date of Patent: Feb. 21, 2023

(54) OSCILLATORY PUMPING SYSTEM FOR LIQUID VIBRATION ISOLATOR

(71) Applicant: BELL TEXTRON INC., Fort Worth, TX (US)

(72) Inventors: Michael Reaugh Smith, Colleyville, TX (US); Frank B. Stamps, Colleyville, TX (US); David E. Heverly, II, Arlington, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 985 days.

(21) Appl. No.: 16/383,161

(22) Filed: Apr. 12, 2019

(65) Prior Publication Data

US 2020/0324883 A1 Oct. 15, 2020

(51) Int. Cl.
| | | |
|---|---|---|
| *B64C 27/00* | (2006.01) | |
| *F16F 13/26* | (2006.01) | |
| *F16F 13/22* | (2006.01) | |
| *F16F 15/027* | (2006.01) | |
| *F16F 7/10* | (2006.01) | |

(52) U.S. Cl.
CPC .......... *B64C 27/001* (2013.01); *F16F 7/1017* (2013.01); *F16F 7/1034* (2013.01); *F16F 13/22* (2013.01); *F16F 13/26* (2013.01); *F16F 15/0275* (2013.01); *B64C 2027/004* (2013.01); *F16F 2222/08* (2013.01); *F16F 2224/04* (2013.01)

(58) Field of Classification Search
CPC ............. B64C 27/001; B64C 2027/004; F16F 7/1017; F16F 7/1034; F16F 13/22; F16F 15/0275; F16F 2224/04
See application file for complete search history.

(56) References Cited

U.S. PATENT DOCUMENTS

| | | | |
|---|---|---|---|
| 4,236,607 | A | 12/1980 | Halwes et al. |
| 5,435,531 | A | 7/1995 | Smith et al. |
| 5,704,596 | A | 1/1998 | Smith et al. |
| 5,788,029 | A | 8/1998 | Smith et al. |
| 6,009,983 | A | 1/2000 | Stamps et al. |
| 6,695,106 | B2 | 2/2004 | Smith et al. |
| 8,499,907 | B2 | 8/2013 | Smith et al. |

(Continued)

FOREIGN PATENT DOCUMENTS

CN 102165215 A * 8/2011 ............ F16F 13/103

OTHER PUBLICATIONS

Halwes, Dennis R. "Total Main Rotor Isolation System Analysis," NASA Contractor Report 165667, Contract NAS1-16211, Jun. 1981, 144 pages; https://ntrs.nasa.gov/archive/nasa/casi.ntrs.nasa.gov/19810018538.pdf.

*Primary Examiner* — Melanie Torres Williams

(74) *Attorney, Agent, or Firm* — Akona IP

(57) ABSTRACT

In some examples, an oscillatory pumping system comprises: one or more active piston, a fluid, and two motors. The one or more active piston is disposed in a channel fluidically coupling two fluid chambers. The passive piston has a frequency response operable to counteract a vibratory displacement. The fluid is disposed in the channel and the two fluid chambers. The two motors couple to the one or more active piston. The two motors are operable to selectively change the frequency response of the passive piston based on oscillating the one or more active piston.

14 Claims, 22 Drawing Sheets

(56) References Cited

U.S. PATENT DOCUMENTS

| | | |
|---|---|---|
| 8,602,400 B2 | 12/2013 | Ward et al. |
| 8,622,375 B2 | 1/2014 | Bosworth et al. |
| 8,684,340 B2 | 4/2014 | Smith et al. |
| 8,840,062 B2 | 9/2014 | Smith et al. |
| 9,145,946 B2 | 9/2015 | Heverly et al. |
| 9,297,439 B2 | 3/2016 | Smith et al. |
| 9,446,841 B2 | 9/2016 | Smith et al. |
| 9,551,393 B2 | 1/2017 | Smith et al. |
| 9,745,055 B2 | 8/2017 | Heverly et al. |
| 9,765,641 B2 | 9/2017 | Smith et al. |
| 9,771,150 B2 | 9/2017 | Smith et al. |
| 10,012,217 B2 | 7/2018 | Heverly et al. |
| 2016/0341226 A1* | 11/2016 | Heverly, II ............. F04B 11/00 |
| 2018/0111679 A1* | 4/2018 | Heverly, II ........... B64C 27/001 |

* cited by examiner

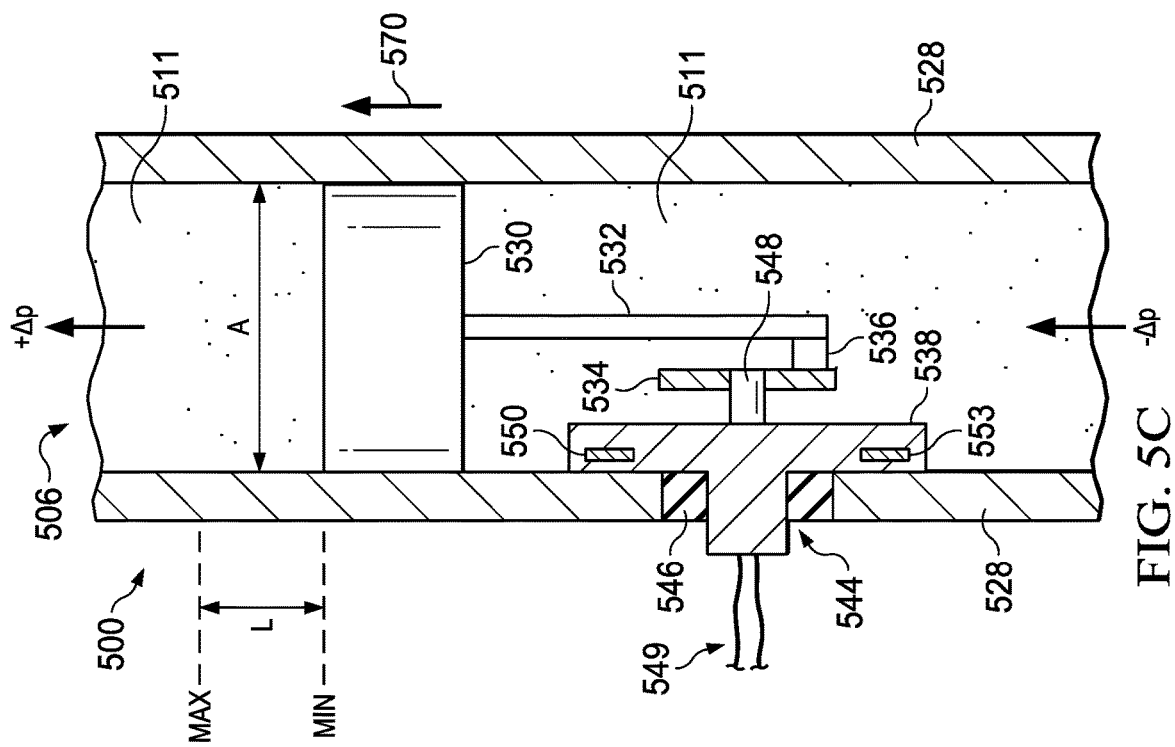
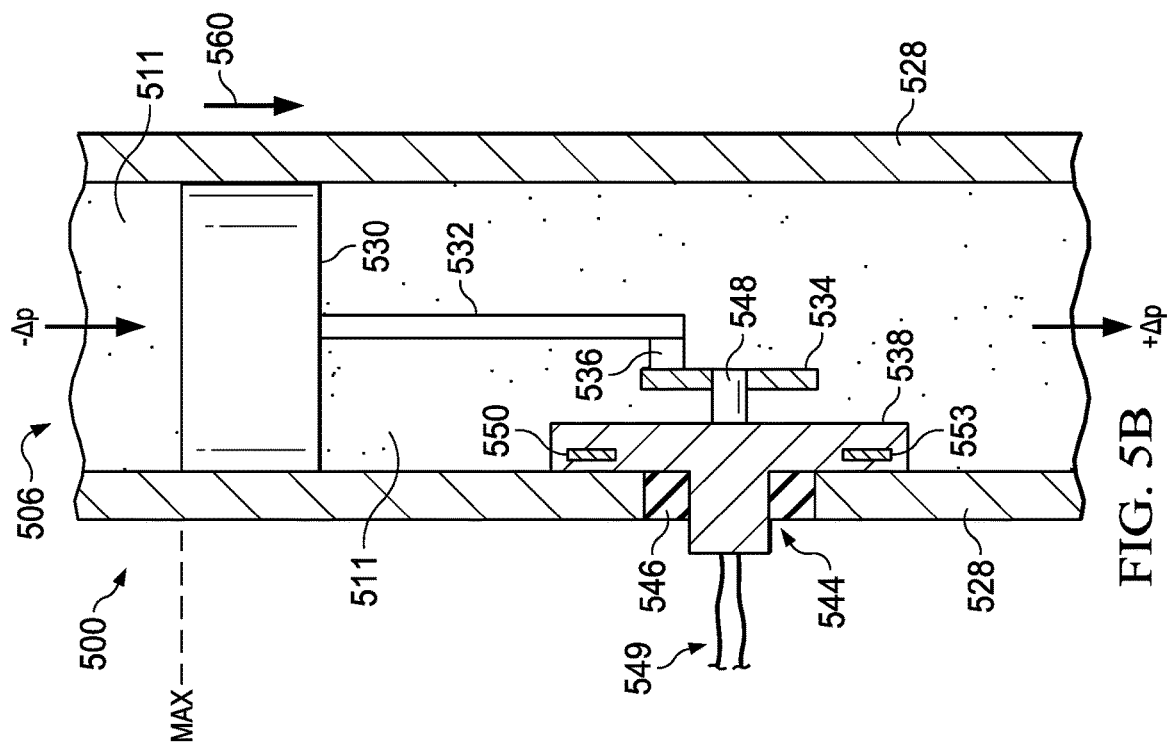
FIG. 5C
FIG. 5B

OSCILLATORY PUMPING SYSTEM FOR LIQUID VIBRATION ISOLATOR

TECHNICAL FIELD

This disclosure relates generally to aircraft, and more particularly, though not exclusively, to systems and apparatuses for controlling vibrations of various components of an aircraft using an actively controlled liquid vibration isolator.

BACKGROUND

Aircraft include mechanical components that produce vibrations during operation. This vibration can be treated with tuned mass absorbers, dampers, or isolators. An absorber counteracts vibrations based on inertia of an object such as a mass being out-of-phase with the vibration and is conservative in that it converts kinetic energy into potential energy and vice versa without dissipating the energy. While tuned mass absorbers may help to mitigate such vibrations they are often heavy and add more weight to an aircraft. A damper includes structural damping, which dissipates energy to reduce the vibrations based on converting the energy to heat. An isolator is a "tuned" device that reduces the vibration transmissibility from the vibrating body to the isolated body about a tuned frequency.

SUMMARY

In some examples, oscillatory pumping system comprises: one or more active piston, a fluid, and two motors. The one or more active piston is disposed in a channel fluidically coupling two fluid chambers. The passive piston has a frequency response operable to counteract a vibratory displacement. The fluid is disposed in the channel and the two fluid chambers. The two motors couple to the one or more active piston. The two motors are operable to selectively change the frequency response of the passive piston based on oscillating the one or more active piston.

In further examples, a vibration isolation system comprises: a housing defining a cavity, a fluid disposed in the cavity, a passive piston, a channel, one or more active piston, and two motors. The passive piston is disposed in the cavity and divides the cavity into two fluid chambers. In addition, the passive piston has a frequency response operable to counteract a vibratory displacement of a vibrating object. The channel fluidically couples the two fluid chambers. The one or more active piston is disposed in the channel. The two motors are coupled to the one or more active piston. The two motors are operable to selectively change the frequency response of the passive piston based on oscillating the one or more active piston.

In some examples, an aircraft comprises: a rotor system, an airframe, and a vibration isolation system coupled to the rotor system and the airframe. The rotor system is operable to generate a vibratory displacement. The vibration isolation system comprises: a housing defining a cavity, a fluid disposed in the cavity, a passive piston, a channel, one or more active piston, and two motors. The passive piston is disposed in the cavity and divides the cavity into two fluid chambers. In addition, the passive piston has a frequency response operable to counteract the vibratory displacement. The channel fluidically couples the two fluid chambers. The one or more active piston disposed in the channel. The two motors are coupled to the one or more active piston. The two motors are operable to selectively change the frequency response of the passive piston based on oscillating the one or more active piston.

BRIEF DESCRIPTION OF THE DRAWINGS

FIGS. 5A, 5B, and 5C are simplified schematics of a vibration isolation system, in accordance with some embodiments of the present disclosure.

DETAILED DESCRIPTION

Figure 1A:
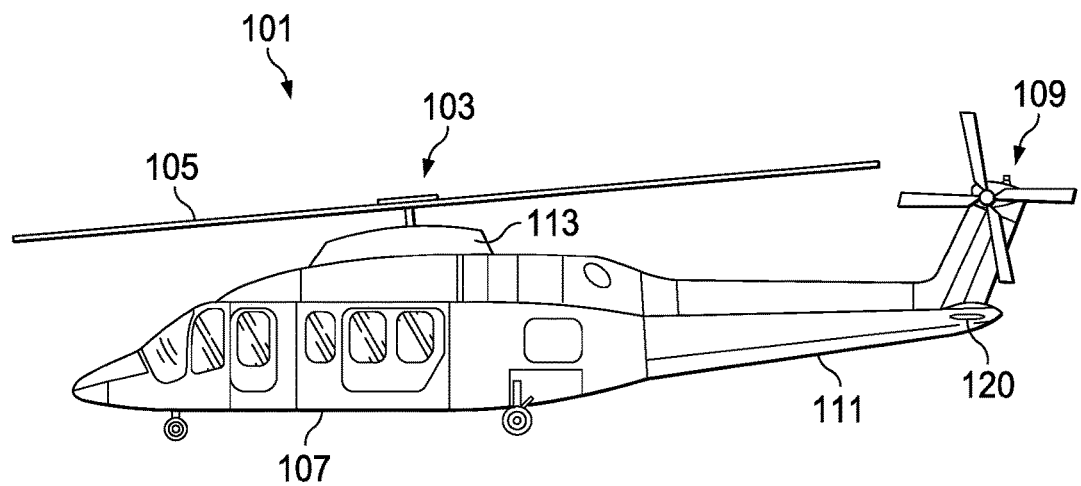
FIGS. 1A, 1B, 2A, and 2B illustrate example aircraft, in accordance with some embodiments of the present disclosure.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiments, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached Figures.

Figure 1B:
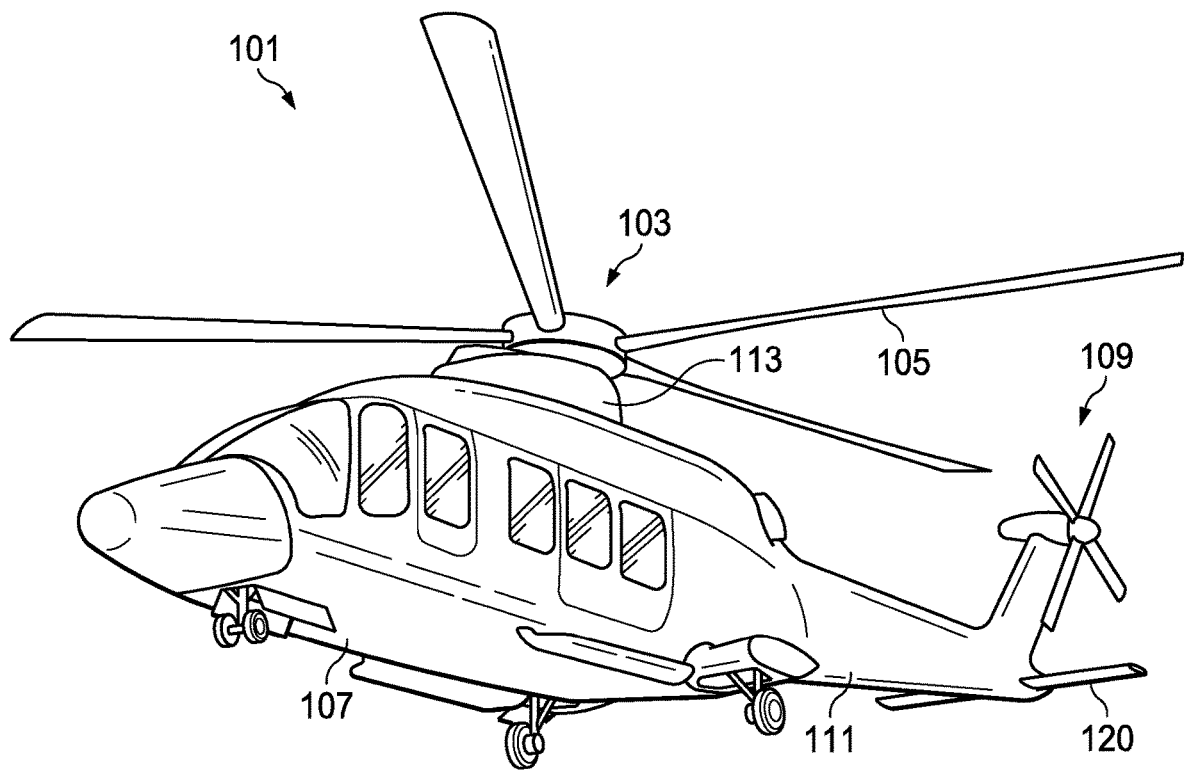

FIGS. 1A and 1B illustrate an example embodiment of a rotorcraft 101. FIG. 1A illustrates a side view of the rotorcraft 101, while FIG. 1B illustrates a perspective view of the rotorcraft 101. Rotorcraft 101 includes a rotor system 103 with a plurality of rotor blades 105. The pitch of each rotor blade 105 can be managed or adjusted in order to selectively control direction, thrust, and lift of the rotorcraft 101. Rotorcraft 101 further includes a fuselage 107, tail rotor or anti-torque system 109, an empennage 111, and a tail structure 120. An airframe (not shown) supports the fuselage 107. The rotor system 103 is coupled to the airframe and, during operating, transmits vibrations to the airframe. In the illustrated embodiment, tail structure 120 may be used as a horizontal stabilizer. Torque is supplied to rotor system 103 and anti-torque system 109 using at least one engine. The rotorcraft 101 includes a variety of fairing and/or cowling assemblies configured to cover or protect components of the rotorcraft and reduce aerodynamic drag. One example upper fairing assembly 113 is arranged above an unillustrated engine and may, at least in part, cover and protect, for example, drivetrain components. Fairings and cowlings provide a relatively smooth outer surface that reduces aerodynamic drag experienced by the rotorcraft 101.

Figure 2A:
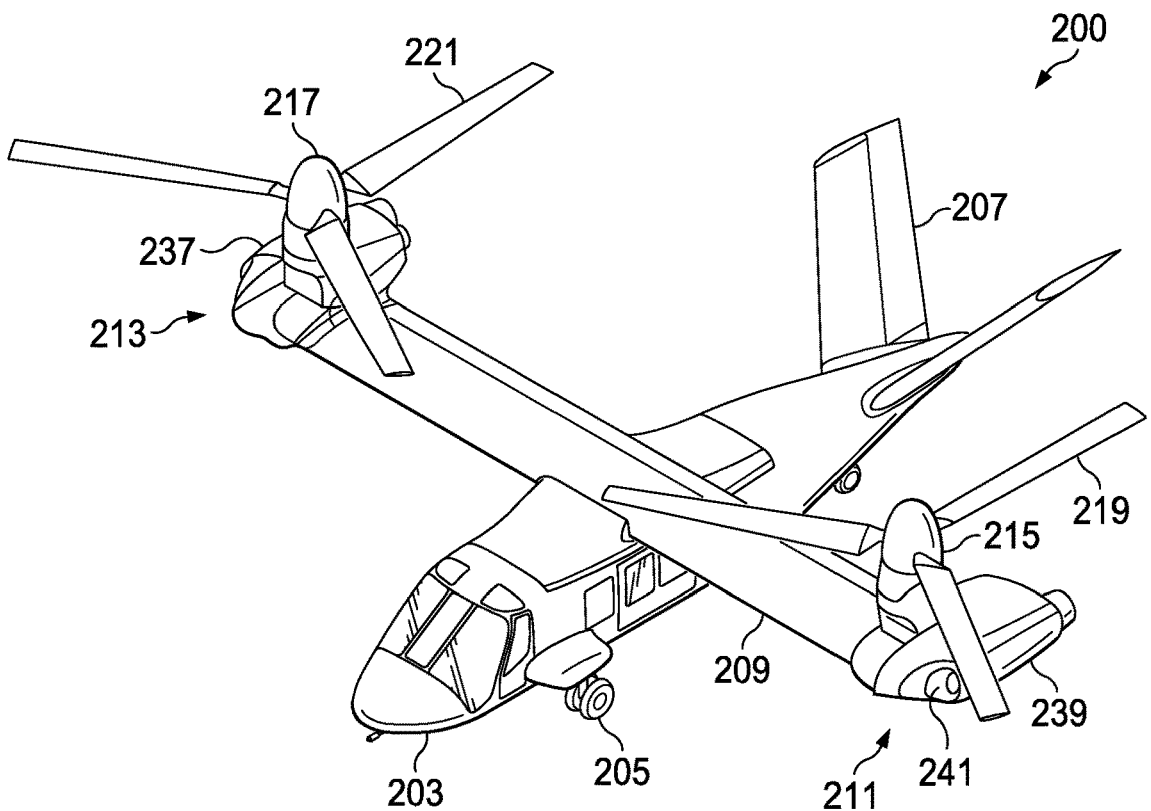
Figure 2B:
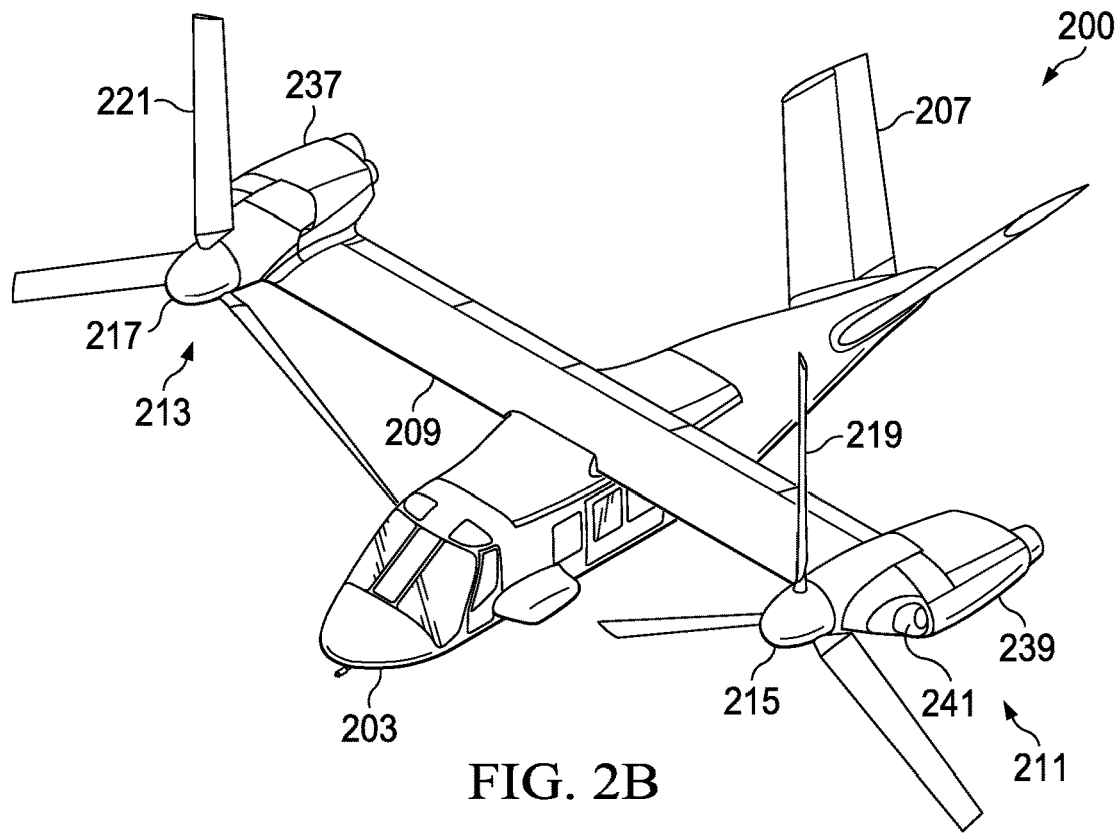

FIGS. 2A and 2B illustrate an exemplary aircraft, which in this case is a tiltrotor aircraft 200. Tiltrotor aircraft 200 can include a fuselage airframe 203, a landing gear 205, a tail member 207, a wing 209, and drive systems 211 and 213. The drive systems 211 and 213 are coupled to the airframe and, during operation, transmit vibrations to the airframe. Each drive system 211 and 213 includes a fixed engine 237 and fixed engine 239, respectively, and a proprotor 215 and 217, respectively. Each of the proprotors 215 and 217 is rotatable and has a plurality of rotor blades 219 and 221, respectively, associated therewith. The position of proprotors 215 and 217, as well as the pitch of rotor blades 219 and 221, can be selectively controlled in order to selectively control direction, thrust, and lift of the tiltrotor aircraft 200.

FIG. 2A illustrates the tiltrotor aircraft 200 in helicopter mode, in which proprotors 215 and 217 are positioned substantially vertical to provide a lifting thrust. FIG. 2B illustrates tiltrotor aircraft 200 in an airplane mode in which proprotors 215 and 217 are positioned substantially horizontal to provide a forward thrust in which a lifting force is supplied by wing 209. It should be appreciated that tiltrotor aircraft can be operated such that proprotors 215 and 217 are selectively positioned between airplane mode and helicopter mode, which can be referred to as a conversion mode.

The drive system 213 is substantially symmetric to the drive system 211. Only for the sake of brevity, certain features will be disclosed only with regard to drive system 211. However, one of ordinary skill in the art will fully appreciate an understanding of the drive system 213 based upon the disclosure herein of the drive system 211.

Figure 3:
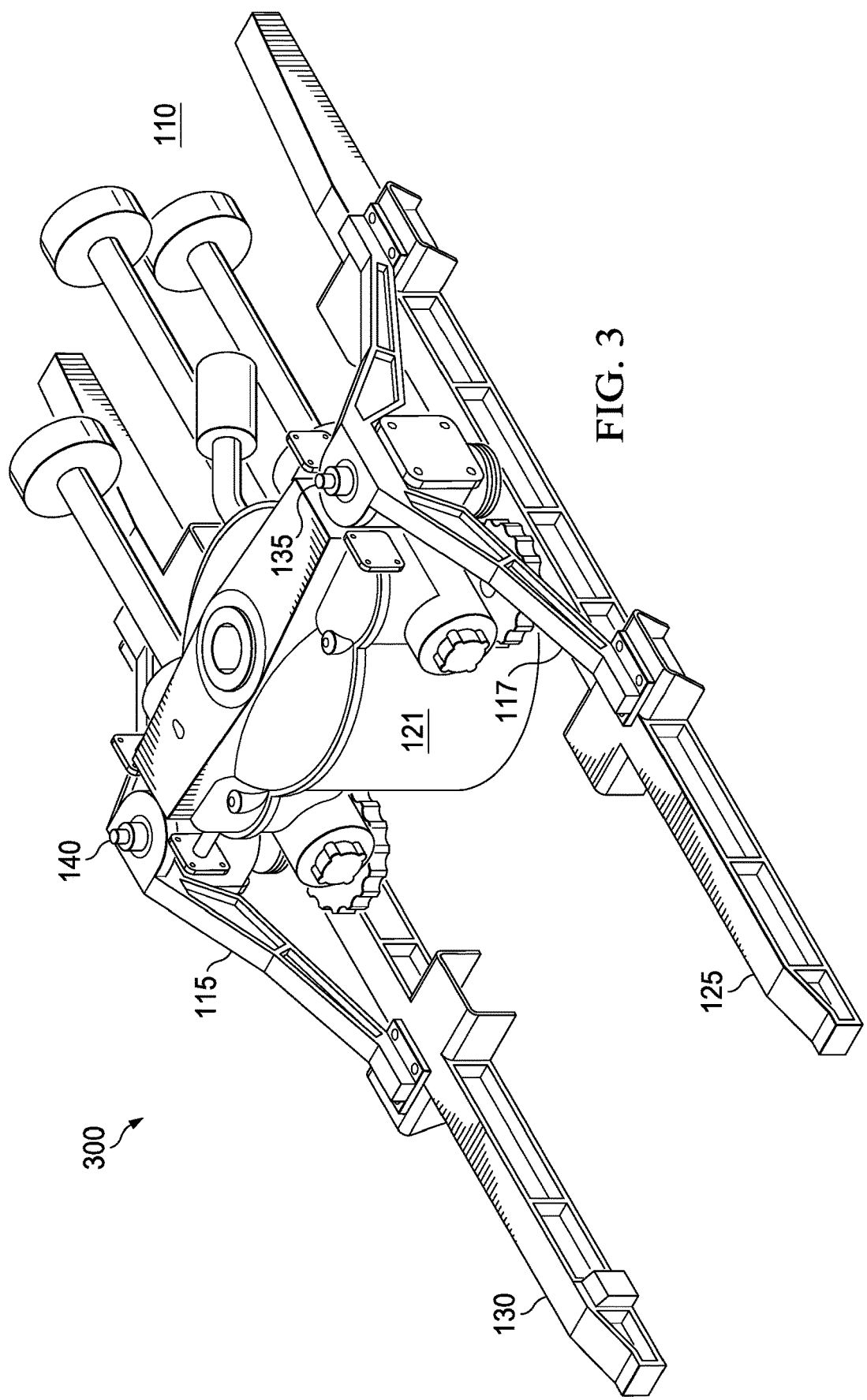
FIG. 3 is a perspective view of a rotor pylon 300, in accordance with some embodiments of the present disclosure.

Further, drive systems 211 and 213 are illustrated in the context of tiltrotor aircraft 200; however, drive systems 211 and 213 can be implemented on other tiltrotor aircraft. In other embodiments, drive systems 211 and 213 can be integrated into a variety of tiltrotor aircraft configurations. Additionally, other drive systems are contemplated. For example, in some embodiments as shown in FIG. 3, a rotor pylon 300 coupled to a gearbox arrangement provides torque to a rotor system of a helicopter.

It should be appreciated that the rotorcraft 101 of FIGS. 1A and 1B and the tiltrotor aircraft 200 of FIGS. 2A and 2B are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

Rotor systems (e.g., rotor system 103 on the rotorcraft 101 and rotor systems 211$a$ and 211$b$ of the tiltrotor aircraft 201) are a major source of vibrations affecting an aircraft. The engines and transmission apply a torque to the rotor system to rotates the rotor blades at a rotational frequency or "$\Omega$". During operation, when all the rotor blades of the rotor system are rotating, the rotor blades collectively cause structures supporting the blades to vibrate. For example, such structures subjected to vibrations can include, but are not limited to a mast supporting the blades, an airframe to which the mast is attached, an empennage or a tail boom attached to the airframe, a wing supporting the rotor system, and the like. The frequency of such vibrations is sometimes referred to as N per revolution and is commonly abbreviated and referred to herein as "N-per-rev." N-per-rev is a function of, among other things, the number of blades, "N", in the rotor system, i.e., assuming identical rotor blades are equally spaced around a rotor hub and moving at a constant rotational velocity. N-per-rev is a frequency that is an integer multiple of the rotational frequency, $\Omega$, of the rotor system, where the integer is the number of blades in the system. For example, a rotor system operating at a rotational frequency of 5 Hz and comprising 3 blades has an N-per-rev equal to 3*5 Hz or 15 Hz. Likewise, a rotor system operating at the same rotational frequency and comprising 5 blades has an N-per-rev equal to 5*5 Hz or about 25 Hz. The operational (i.e., rotational) frequency, $\Omega$, is also referred to as 1-per-rev. Any structural aircraft component that has a first natural frequency that is approximately equal to N-per-rev is likely to resonate during operation of the aircraft, which could cause undesirable effects and even catastrophic failure of the component. Therefore, it is desirable for aircraft structural natural frequencies to lie either above or below N-per-rev.

Though an aircraft component may have a first natural frequency that does not coincide with an operational frequency of an aircraft, it can still experience vibrations during the operation of the aircraft. Some aircraft components such as airframes, fuselages, wings, and empennages vibrate based on the vibratory forces and, resulting vibratory displacements, transmitted by a rotor system. Consequently, the aircraft components may be fitted with vibration control systems to mitigate such vibrations. Some vibration control systems are "tuned" to counteract vibration at a particular frequency. Such tuning may include selecting a combination of mass, stiffness, and damping of the vibration control systems such that the system counteracts displacements within a target frequency range. A Liquid Inertia Vibration Eliminator (LIVE) isolator contains a tuned column of liquid that acts in a manner similar to a pendulum that can vibrate 180° out of phase with respect the vibratory motion at a particular frequency and, thereby, provide an inertial force that counteracts vibrations at the particular frequency. Several examples of LIVE isolators are provided in U.S. Pat. No. 4,236,607 entitled "VIBRATION SUPPRESSION SYSTEM" issued on Dec. 2, 1980 and U.S. Pat. No. 5,704,596 entitled "VIBRATION ISOLATION SYSTEM" issued on Jan. 6, 1998, each of which is hereby incorporated by reference in its entirety. One challenge in such tuned systems is that because they are tuned to a particular frequency, they may be ineffective for counteracting vibrations at other frequencies. Indeed, a tuned system, which is tuned for a particular frequency, may actually exacerbate vibration at frequencies outside of the particular frequency.

A solution to the above-identified challenge (and others) disclosed herein includes an oscillatory pumping system to selectively tune a frequency response of a liquid inertia isolator based on oscillating one or more active piston in a fluidic channel. Each of the one or more piston may be a reciprocating piston. While the liquid inertia isolator may be tuned to counteract vibration at a specific isolation frequency range, the oscillatory pumping system can advantageously modify the isolation frequency range to, in effect, cover ranges in which the liquid inertia isolator would otherwise be less effective, ineffective, or counterproductive. Advantageously, the oscillatory pumping systems of the present disclosure may selectively supplement or diminish the inertia by accelerating a fluid through a channel. In addition, oscillatory pumping systems of the present disclosure may include a motor that is submerged in and in direct contact with the fluid. The fluid can be used simultaneously to adjust operational characteristics of a liquid inertia isolator and to cool the motor. Embodiments of the present disclosure rely on, among other things, inertance of the fluid, to attenuate vibrations.

It is noted that a damper includes structural damping, which dissipates energy to reduce the vibrations (e.g., friction, heat, viscosity). It is further noted, that an absorber counteracts vibrations based on inertia of an object such as a mass (e.g., opposing displacements to mitigate vibratory displacements) and acts over a wide frequency range. In contrast, embodiments of the present disclosure utilize the concept of an isolator, rather than a dissipative damper or inertial absorber, that treats vibration in the vicinity of a tuned isolation frequency. Consider the spring-mass-damper system described in Equation 1 in which an excitation force, F, is a harmonic vibration. Correspondingly, the motion will be harmonic as described in Equations 2a, 2b, and 2c. Note that for harmonic motion, the displacement Equation 2a is out of phase with acceleration Equation 2c. Substituting Equations 2a, 2b, and 2c into Equation 1, results in the characteristic Equation 3. Hence the isolator is tuned to cancel, that is bring to zero, the $(k-\omega^2 m)$ term in Equation 3, and the isolator is designed to minimize damping in the $i(\omega c)$ term. The tuned isolation frequency, $\omega$, is in radians per second and is equal to the triple product of 2 times pi times the tuned isolation frequency in terms of Hertz. It is noted that for a vibration isolator, damping actually increases vibration transmissibility at the tuned isolation frequency.

It is further noted that the oscillatory pumping systems of the present disclosure can selectively increase or decrease the apparent mass of a tuned column of liquid, which is designated as m in Equations 1 and 3. This, in turn, can decrease or increase the tuned frequency of the isolator. In addition, the phase of the oscillatory pumping system can be such that it is in or out of phase with the velocity of the tuned column of liquid, which results in increasing or decreasing the apparent damping coefficient, c, in Equations 1 and 3. By doing so, the dissipating damping effect can be reduced or eliminated which results in deepening the isolation valley, that is further reducing the vibration transmissibility.

$$m\frac{d^2u}{dt^2} + c\frac{du}{dt} + ku = Fe^{i\omega t} \qquad \text{Eq. 1}$$

$$u = \Phi e^{i\omega t} \qquad \text{Eq. 2a}$$

$$\frac{du}{dt} = i\omega \Phi e^{i\omega t} = i\omega u \qquad \text{Eq. 2b}$$

$$\frac{d^2u}{dt^2} = -\omega^2 \Phi e^{i\omega t} = -\omega^2 u \qquad \text{Eq. 2c}$$

$$[(k - \omega^2 m) + i(\omega c)] = 0 \qquad \text{Eq. 3}$$

FIG. 3 is a perspective view of a rotor pylon 300, which may be used to mount a rotor system such as 103, 211, and 213 to an aircraft such as 101 or 200. For example, the rotor pylon 300 may be housed under a fairing such as the upper fairing assembly 113 of the rotorcraft 101. A transmission 121 transmits power from a power plant (not shown), such as a jet turbine engine, through drive shafts 110, to a rotor assembly (not shown) to provide lift and propulsion for the aircraft. Transmission 121 is connected to pylons 115 and 117, which extend upwardly from roof beams 125 and 130. Vibrations isolators may be provided to minimize the transfer of vibrations from the transmission 121 and other components to the rest of the aircraft. In the embodiment illustrated in FIG. 3, vibration isolators 135 and 140 according to the present specification are connected between transmission 121 and pylons 115 and 117, respectively.

Figure 4:
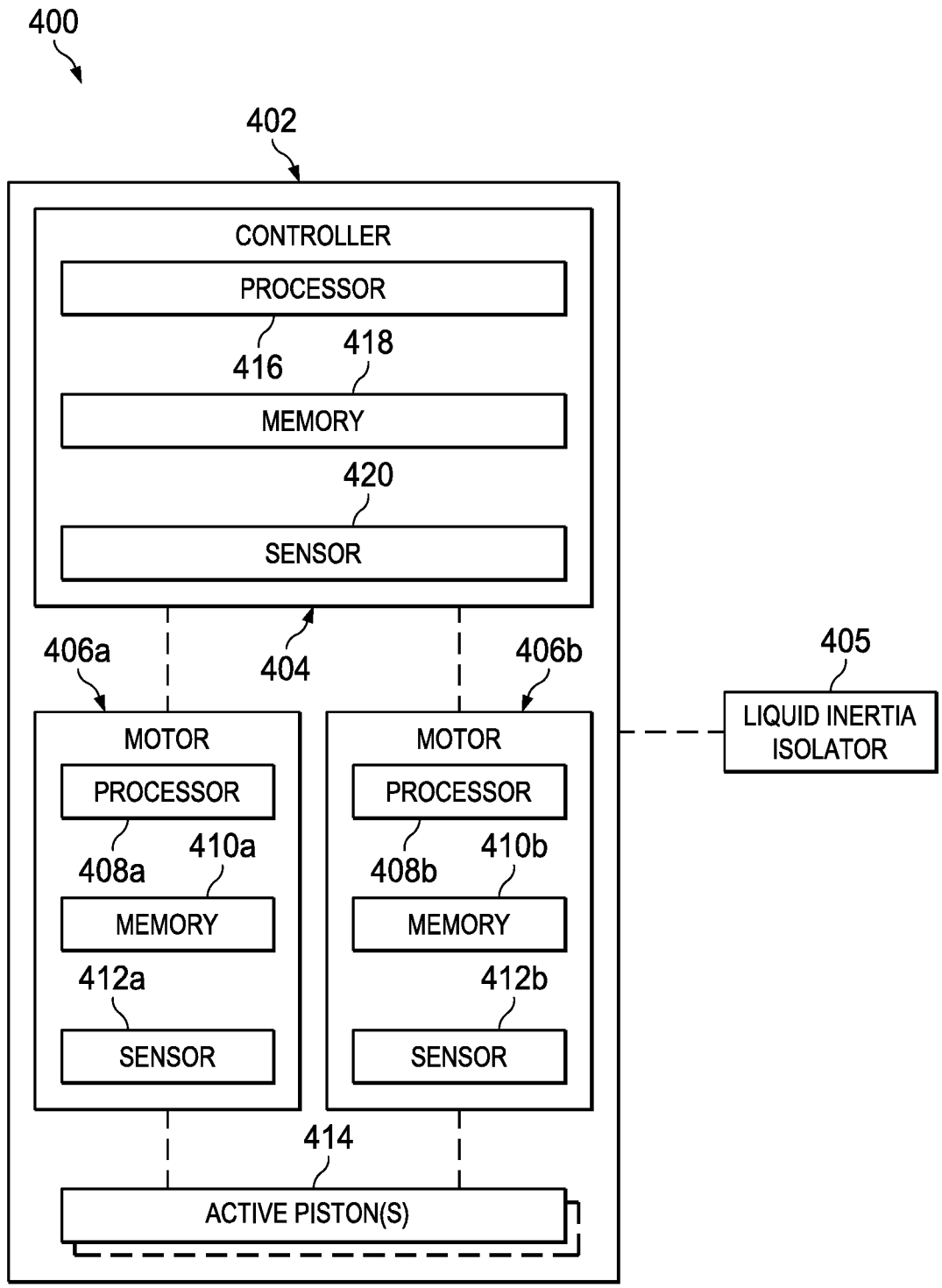
FIG. 4 is a simplified component diagram of a vibration isolation system, in accordance with some embodiments of the present disclosure.

FIG. 4 is a simplified component diagram of a vibration isolation system 400, in accordance with some embodiments of the present disclosure. The vibration isolation system 400 includes an oscillatory pumping system 402 fluidically coupled to a liquid inertia isolator 405. The liquid inertia isolator 405 may include any oscillatory liquid inertia isolator such as a liquid inertia vibration eliminator (LIVE) unit or any other. The liquid inertia isolator 405 has a frequency response based on its structural properties. The oscillatory pumping system 402 can selectively transfer a force to a passive piston in the liquid inertia isolator 405 to vary an operational characteristic of the liquid inertia isolator 405. The oscillatory pumping system 402 includes a controller 404, motors 406a and 406b, and one or more active piston 414. In some examples, the one or more active piston 414 includes only a single active piston. Alternatively, the one or more active piston 414 may include two or more active pistons. The controller 404 is operably coupled to the motors 406a and 406b. The controller 404 includes a processor 416, a memory 418, and a sensor 420. The motors 406a and 406b are coupled to and are operable to oscillate the one or more active piston 414. The motors 406a and 406b drive the oscillation of the active pistons 414a and 414b at a driving frequency. The controller 404 can set a driving frequency of each of the motors 406a and 406b independently of one another. The motors 406a and 406b includes processor 408a and 408b, memory 410a and 410b, and sensors 412a and 412b, respectively. Each of the one or more active piston 414 may be disposed in a channel, which is fluidically coupled to the liquid inertia isolator 405. A phase angle of each of the motors 406a and 406b describes a current angular position of the motor within a cycle of the oscillation such as a position within a sine wave. The controller 404 can adjust the phase angle of each of the motors 406a and 406b by modifying the angular position and/or the driving frequency of one or more of the motors 406a and 406b to selectively drive the one or more active piston 414. In some examples, one or more of the motors 406a and 406b comprises a servomotor.

The motors 406a and 406b may utilize the processors 408a and 408b, respectively, to drive operation of the motors such as setting and maintaining the driving frequency. The memory 410a and 410b may store executable instructions, data including operational characteristics such as angular position, angular speed, angular velocity, phase angle, temperature, other data, an/or combinations thereof. The sensors 412a and 412b may determine an angular position of the motors 406a and 406b, respectively. For example, the sensors 412a and 412b may include any sensor element such as a Hall sensor. Other methods such as Back Electro-Motive Force (BEMF) detection, or any other approach may be used to detect position/orientation of the motors 406a and 406b. The processors 408a and 408b may control circuitry to drive rotation of a shaft of the motors 406a and 406b, respectively, and may execute instructions stored on the memory 410a and 410b, respectively.

The controller 404 may utilize the processor 416 to drive operation of each of the motors 406a and 406b. The memory 418 may store executable instructions, data including associated with the motors 406a and 406b, the one or more active piston 414, and/or the liquid inertia isolator 405, other data, and/or combinations thereof. The sensor 420 determine and/or detect data associated with the angular position of each of the motors 406a and 406b, data associated with current displacement of the liquid inertia isolator 405, data associated a frequency response of the liquid inertia isolator 405, other data, and/or combinations thereof. The processor 416 can control circuitry to drive operation of the motors 406a and 406b and may execute instructions stored on the memory 418.

The controller 404 can adjust the frequency response of the vibration isolation system 400 based on adjusting a relative phase angle (RPA) between the motors 406a and 406b and/or an RPA between the one or more active piston 414. The RPA is the difference between the phase angles of the active pistons 414a and 414b or individual members of the one or more active piston 414, as the case may be. The controller 404 can independently drive an angular position of each of the motors 406a and 406b and, therefore, can control the RPA between the motors 406a and 406b. The one or more active piston 414 may oscillate at a frequency based on the RPA between the motors 406a and 406b. Thus, the controller 404 may adjust the frequency and/or magnitude of the oscillations of the one or more active piston 414 to selectively modify the frequency response of the liquid inertia isolator 405.

In examples where the one or more active piston 414 includes only a single active piston, oscillating the two motors out of phase but not in antiphase with one another (i.e., 0°<RPA<180°, or −180°<RPA<0°), produces a net displacement of the single active piston and, therefore, alters the frequency response of the liquid inertia isolator 405. The net displacement causes a pressure difference in the channel, which is cyclically reversed in direction (e.g., between positive pressure and negative pressure) at the driving frequency of the motors. Thus, the frequency response is modified and is not the same as without the net pressure difference. Oscillating the two motors in phase with one another (i.e., RPA=0°), produces a maximum net displacement of the single active piston and therefore makes a maximum possible change in the frequency response of the liquid inertia isolator 405. Oscillating the two motors in antiphase with one another (i.e., RPA=±180° RPA), produces zero net displacement of the single active piston (or very small displacement as 0.01 cm or less) in the channel and, therefore, leaves the frequency response of the liquid inertia isolator 405 unaltered. Thus, the frequency response is not modified.

In examples where the one or more active piston 414 includes two active pistons, oscillating the two active pistons out of phase but not in antiphase with one another (i.e., 0°<RPA<180°, or −180°<RPA<0°), produces a net pressure difference in the channel and, therefore, alters the frequency response of the liquid inertia isolator 405. This net pressure difference is cyclically reversed in direction (e.g., between positive pressure and negative pressure) at the driving frequency of the motors. Thus, the frequency response is modified and is not the same as without the net pressure difference. Oscillating the two active pistons in phase with one another (i.e., RPA =0°), produces a maximum net pressure difference in the channel and therefore makes a maximum possible change in the frequency response of the liquid inertia isolator 405. Oscillating the two active pistons in antiphase with one another (i.e., RPA=±180° RPA), produces zero net pressure difference (or very little such as 0.01 kg/(m*s2) or less) in the channel and, therefore, leaves the frequency response of the liquid inertia isolator 405 unaltered. Thus, the frequency response is not modified.

During operation, the controller 404 may determine the angular position of each of the motors 406a and 406b and correlate the angular position of each of the motors 406a and 406b to a phase angle of each of the active pistons 414a and 414b. For example, the controller 404 may execute a function relating the motors' 406a and 406b angular positions to a phase angle of the one or more active piston 414 and/or a function relating relative phases between the individual members of the one or more active pistons 414 and to a frequency response of the liquid inertia isolator 405. Based on the functions, the controller 404 can adjust the motors 406a and 406b to move closer to a desired target RPA to achieve a target frequency response of the liquid inertia isolator 405. Such a function can take, as input, a target isolation frequency of the liquid inertia isolator 405 and generate, as output, a target RPA between the motors 406a and 406b. The controller 404 may determine an RPA between the motors 406a and 406b based on the phase angle of each of the motors 406a and 406b. The controller 404 may then modify an angular position of at least one of the motors 406a and 406b to change the RPA between the active motors 406a and 406b based on the target RPA. The controller 404 may then control operation of the one or more active piston 414 via the motors 406a and 406b.

A processor can execute instructions from a memory. A processor may comprise a microprocessor, controller, an application-specific integrated circuit (ASIC), a field programmable gate array (FPGA), digital signal processor (DSP), or any other suitable computing device, resource, or combination of hardware, stored software and/or encoded logic operable to process data.

Memory may comprise any form of volatile or nonvolatile memory including, without limitation, magnetic media (e.g., one or more tape drives), optical media, random access memory (RAM), read-only memory (ROM), flash memory, removable media, an erasable programmable read only memory (EPROM), an electrically erasable programmable ROM (EEPROM)), a memory element in an application-specific integrated circuit (ASIC), a memory element in a field programmable gate array (FPGA), or any other suitable memory component or components.

Operations outlined herein may be implemented using logic, which can include fixed logic, hardware logic, programmable logic, digital logic, etc. For example, in some embodiments, logic may be encoded in one or more tangible media, which may be inclusive of non-transitory tangible media and/or non-transitory computer readable storage media (e.g., embedded logic provided in an ASIC, embedded logic provided in an FPGA, logic provided digital signal processing instructions, in software [potentially inclusive of object code and source code] to be executed by a processor, or other similar machine, etc.).

Figure 5A:
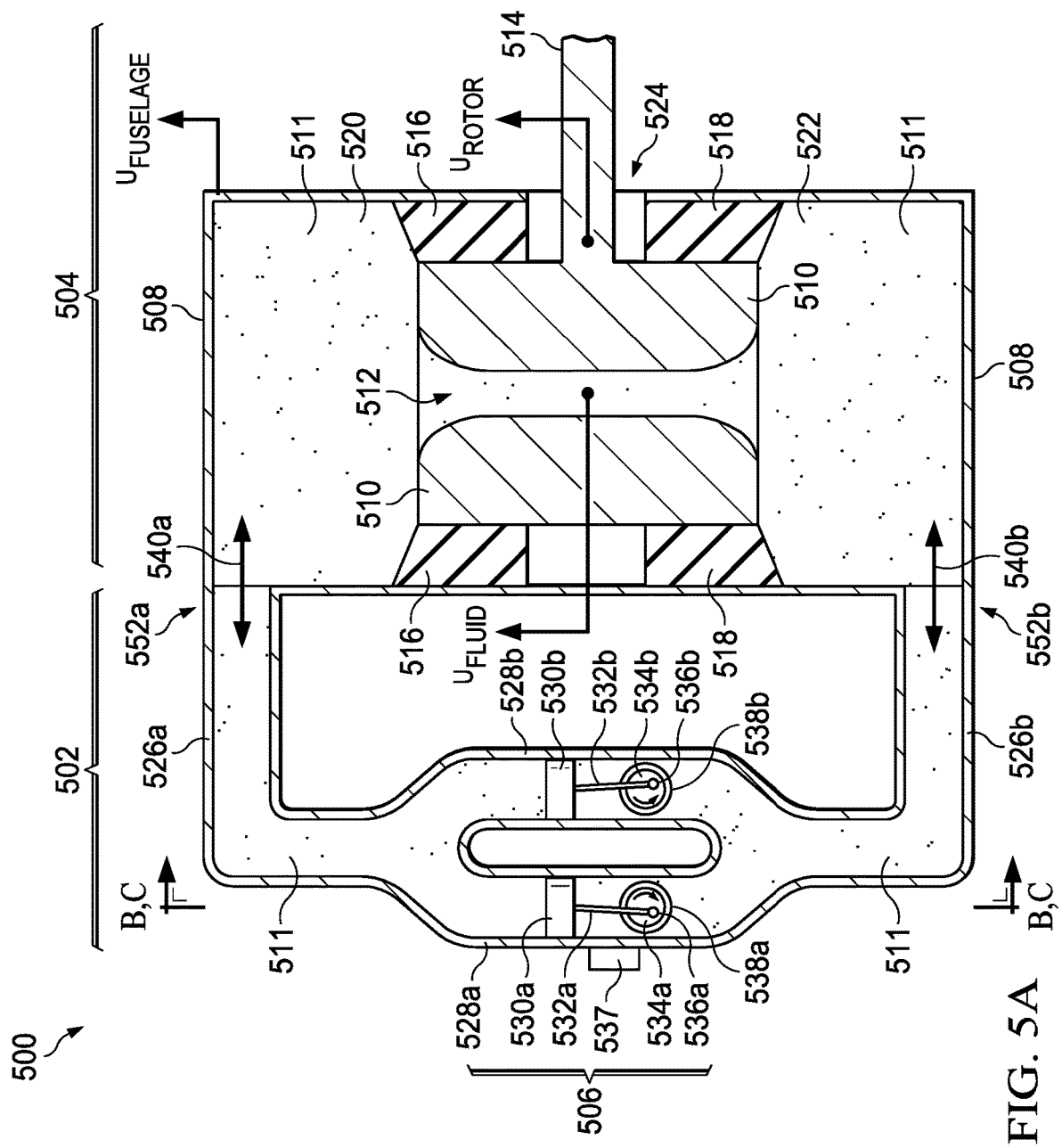

FIGS. 5A, 5B, and 5C are simplified schematics of a vibration isolation system 500, in accordance with some embodiments of the present disclosure. The vibration isolation system 500 includes an oscillatory pumping system 506, which is fluidically coupled to a liquid inertia isolator 504 by a channel assembly 502.

The liquid inertia isolator 504 includes a housing 508, a passive piston 510, and elastomeric seals 516 and 518. The housing 508 defines a cavity, which is generally cylindrical in shape. The passive piston 510 is disposed within the cavity of housing 508. The passive piston 510 includes a passage 512 and an arm 514, which may be coupled to an object that is a source of a vibration such as a rotor system or other vibratory component of an aircraft. The housing 508 may be coupled to an object that is being isolated from the vibration such as a fuselage. The liquid inertia isolator 504 includes a housing 508, the passive piston 510, and elastomeric seals 516 and 518. The housing 508 defines a cavity, which is generally cylindrical in shape. The elastomeric seals 516 and 518 are disposed between the housing 508 and the passive piston 510. A fluid chamber is defined by the interior of housing 508, the passive piston 510, and the elastomeric seals 516 and 518. Together, the passive piston 510 and the elastomeric seals 516 and 518 divide the cavity into fluid chambers 520 and 522. The fluid chamber comprises the fluid chambers 520 and 522. In addition to sealing the fluid chambers 520 and 522, elastomeric seals 516 and 518 function as a spring to facilitate the passive piston 510 oscillating relative to housing 508, while maintaining the passive piston 510 in a central location within housing 508 when no load is applied. The elastomeric seals 516 and 518 are disposed between the housing 508 and the passive piston 510. A fluid 511 is disposed within the fluid chamber, the passage 512, and the channel assembly 502. The fluid 511 may be a dense, inviscid, non-corrosive, inert fluid such as a liquid coolant (e.g., a fluorocarbon oil, fluorinated ketone, and the like). In some examples, the fluid 511 is non-electrically conductive or dielectric. A density of the fluid 511 is known density.

Figure 6:
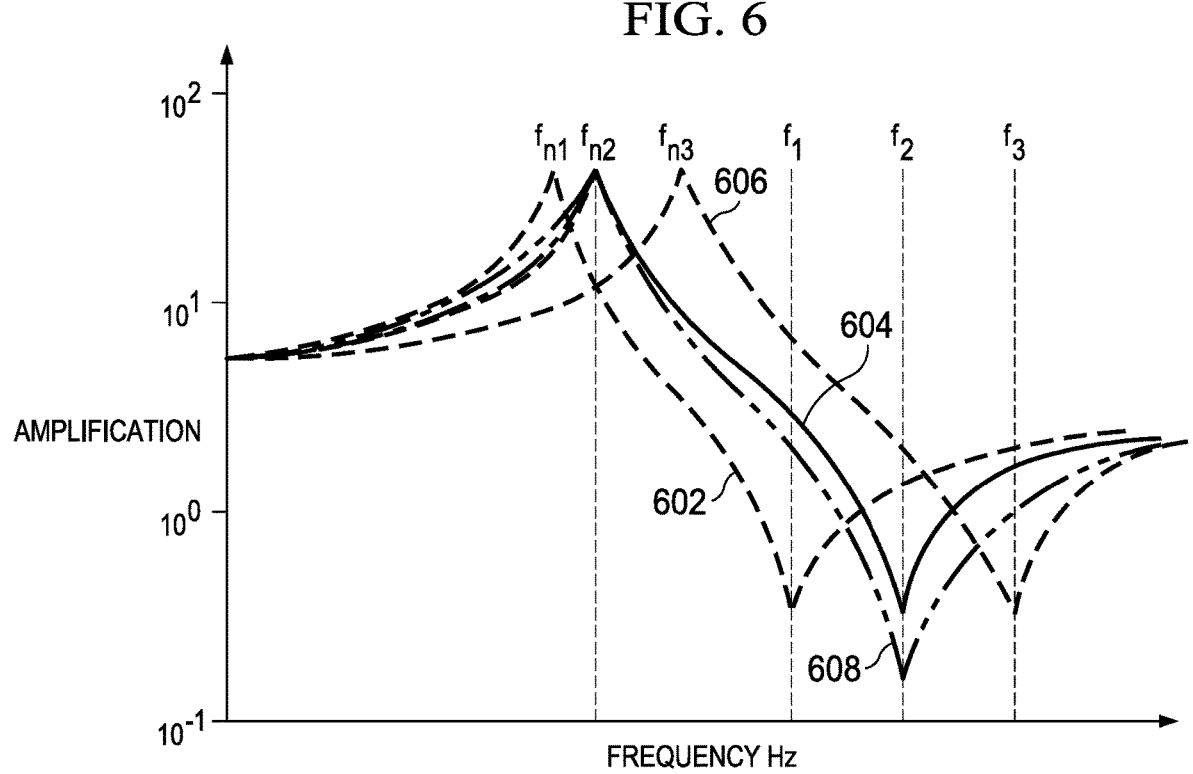
FIG. 6 illustrates a graph of frequency responses of the vibration isolation system, in accordance with some embodiments of the present disclosure.

The passive piston 510 includes the passage 512, which extends centrally through passive piston 510 and facilitates a flow of the fluid 511 between the fluid chambers 520 and 522. The passage 512 is continuous and unobstructed and therefore, provides continuous, unobstructed fluid communication between the fluid chambers 520 and 522. The passage 512 can hold a known volume of the fluid 511 and, because the density of the fluid 511 is known, the mass of fluid 511 in the passage is known and may be tuned to a specific value (e.g., to create a tuned volume of the fluid 511 in the passage 512, which has a corresponding tuned mass). When loaded, the passive piston 510 oscillates within the fluid 511, which forces the fluid 511 to reciprocally cycle between the fluid chambers 520 and 522. This oscillatory movement of the fluid 511 produces an inertial force from accelerating the tuned volume of the fluid 511 in passage 512. The inertial force, in part, defines a frequency response of the passive piston 510 to counteract a vibratory motion of a vibrating object. In general, introduction of a force to the passive piston 510 causes the passive piston 510 to move, thereby causing a movement of the fluid 511 through the passage 512. The movement of the fluid 511 through the passage 512 produces an inertial force that can cancel the force from the passive piston 510 at an isolation frequency. The oscillatory pumping system 506 is used to introduce a force to the passive piston 510 and, thereby, alter the isolation frequency of the liquid inertia isolator 504 as shown in FIG. 6.

The channel assembly 502 includes a main channel 526 (i.e., main channel portions 526a and 526b) and branch channels 528a and 528b coupled to the main channel 526. The main channel portion 526a is in fluid communication with the fluid chamber 520 at a first end 552a of the main channel 526. The main channel portion 526b is in fluid communication with the fluid chamber 522 at a second end 552d of the main channel 526. The oscillatory pumping system 506 is disposed in the channel assembly 502.

The oscillatory pumping system 506 includes a controller 537, motors 538a and 538b, and active pistons 530a and 530b. Each of the motors 538a and 538b includes a shaft 548, wires 549, a sensor 550, and a processing unit 553 (FIGS. 5A and 5B). Linkages including flywheels 534a and 534b, cranks 536a and 536b and connecting rods 532a and 523b operably couple the motors 538a and 538b and the active pistons 530a and 530b, respectively. The flywheels 534a and 534b are attached to a driveshaft on the motors 538a and 538b, respectively. The cranks 536a and 536b are attached to the flywheels 534a and 534b, respectively. The connecting rods 532a and 523b are attached between the cranks 536a and 536b and the active pistons 530a and 530b, respectively. The motors 538a and 538b drive the oscillation of the active pistons 530a and 530b, respectively, via the linkages.

The active pistons 530a and 530b are disposed in and obstruct the branch channels 528a and 528b, respectively. The active pistons 530a and 530b inhibit free flow of the fluid 511 through the channel assembly 502 between the first end 552a and the second end 552d of the main channel 526. Instead, the active pistons 530a and 530b can force the fluid 511 to move in a reciprocating motion in the channel assembly 502 between the fluid chambers 520 and 522 as generally indicated by 540a and 540b. This movement of the fluid 511 is used to selectively accelerate or decelerate the tuned volume of the fluid 511 (e.g., a fluid column) in the passage 512. The active pistons 530a and 530b are oscillated at the same frequency and amplitude but may or may not be in phase with one another. The controller 537 can adjust a phase angle of each of the active pistons 530a and 530b by modifying an angular position of one or more of the motors 538a and 538b. Thus, the controller 537 can adjust the frequency response of the liquid inertia isolator 504 based on adjusting a relative phase angle (RPA) between the active pistons 530a and 530b. For example, oscillating the active pistons 530a and 530b out of phase but not in antiphase with one another (i.e., 0°<RPA<180°, or −180°<RPA<0°), produces a net pressure difference in the channel assembly 502 and, therefore, forces the fluid 511 to oscillate between the fluid chambers 520 and 522 at a particular amplitude. When the resulting motion of the fluid 511 ($u_{fluid}$) produces a positive change in pressure +Δp that is counter to, i.e., out of phase with, the acceleration of the tuned mass of the fluid 511 within the passage 512, the frequency response of the liquid inertia isolator 504 simulates a system with the tuning mass having more inertia. This results in a frequency response 602, which has a lower isolation frequency $f_1$ than the isolation frequency $f_2$ of the passive frequency response 604. FIG. 6, which is described in further detail below, illustrates plots 602, 604, 606, and 608 of frequency responses of the liquid inertia isolator 504. When the resulting motion of the fluid 511 produces negative pressure −Δp that is in phase with the acceleration of the tuned mass of the fluid 511 within the passage 512, the frequency response of the liquid inertia isolator 504 simulates a system with the tuning mass having less inertia. This results in a frequency response 606, which has a higher isolation frequency $f_3$ than the isolation frequency $f_2$ of the passive frequency response 604. When the resulting motion of the fluid 511 produces positive pressure +Δp that is in phase with the velocity of the tuned mass of the fluid 511 in the passage 512, the frequency response simulates a system with less damping. This results in a frequency response 608 that has a deeper valley of isolation and less transmissibility at the isolation frequency than the passive frequency response 604. When the active pistons 530a and 530b oscillate in phase with one another (i.e., RPA=0°), they produce a maximum net pressure difference in the channel assembly 502 and, therefore, forces the fluid 511 to oscillate between the fluid chambers 520 and 522 at maximum amplitude. Oscillating the active pistons 530a and 530b in antiphase with one another (i.e., RPA=±180°), produces zero net pressure difference in the channel assembly 502 and, therefore, fails to produce any oscillation of the fluid 511 between the fluid chambers 520 and 522. The resulting frequency response remains unchanged from the passive frequency response 604.

FIGS. 5B and 5C illustrate a cross section of a portion of the oscillatory pumping system 506 from a perspective as generally indicated by the arrows labeled "B,C" in the FIG. 5A. These figures are labeled to show corresponding actions in either of the two branch channels 528 (i.e., 528a and/or 528b). The oscillatory pumping system 506 is disposed in the branch channel 528. A fixed (non-rotating) housing of the motor 538 extends through an opening 544 in the two branch channel 528. A static seal 546 seals between the motor 538 and the opening 544. A static seal is inclusive of a seal designed for no (or little) relative motion between components and the seal. A dynamic seal is inclusive of a seal designed for relative motion between components and the seal. Because the motor 538 is submerged in the fluid 511 and a housing of the motor 538 is fixed, the system may lack a dynamic seal. In some examples, the static seal 546 comprises an O-ring. The motor 538 is submerged in and in direct contact with the fluid 511. In some examples, such as when the housing of the motor 538 is not sealed, an electrically charged component such as internal circuits, coils, and/or other electronics of the motor 538 are in direct contact with the fluid 511. Thus, in some examples, the fluid 511 comprises a non-electrically conductive liquid, such as a liquid coolant, a fluorinated ketone, or other liquid. Advantageously, the motor 538 being submerged in and in direct contact with the fluid 511 (e.g., a dielectric liquid coolant) enables the motor 538 to operate at high operational speeds without concern of overheating due to the direct cooling provided by the fluid 511. Thus, the fluid 511 can be used simultaneously to adjust operational characteristics of a liquid inertia isolator (e.g., based on the motion of the fluid 511) and to cool the motor 538, which is used to pump the fluid 511 (e.g., based on the motor 538 being submerged in the fluid 511). The motor 538 being submerged in the fluid 511 can increase a temperature of the fluid 511, e.g., due to the fluid 511 absorbing heat from the motor 538. Some embodiments include a heat dissipation system for dissipating heat energy from the fluid 511. A heat dissipation system may include a passive system such as a convective heat transfer system or an active system such as an active pump or fan to force a liquid or gas over a housing to dissipate the heat energy from the fluid 511.

FIG. 5B illustrates, among other things, an active piston 530 near a crest of an oscillatory cycle. The active piston 530 is near its maximum stroke point labeled "MAX." in FIG. 5B. At this point, the active piston 530 is moving down in the branch channel 528, which creates a negative pressure difference −Δp above the active piston 530 and an equal positive pressure +Δp below the active piston 530. FIG. 5C illustrates, among other things, the active piston 530 near a trough of an oscillatory cycle. The active piston 530 is near its minimum stroke point labeled "MIN." in FIG. 5C. At this point, the active piston 530 is moving up in the branch channel 528, which creates a positive pressure difference +Δp above the active piston 530 and an equal negative pressure difference −Δp below the active piston 530. Over a total oscillatory cycle, the active piston 530 has a stroke length, L. Multiplying the stroke length, L by surface area, A, of the active piston 530 gives a displacement volume of the active piston 530. The displacement volume determines the amount of fluid 511 displaced during a single cycle of the active piston 530. A magnitude of the displacement of the fluid and, therefore, the passive piston 510 are, at least in part, based on the displacement volume of the active piston 530.

FIG. 6 illustrates a graph 600 of frequency responses of the vibration isolation system 500, according to some embodiments of the present disclosure. The graph 600 shows amplification versus input frequency in Hertz. The vibration isolation system 500 has a corresponding natural frequency $f_{ni}$ (e.g., $f_{n1}$, $f_{n2}$, $f_{n2}$, and $f_{n3}$) for each frequency response represented by a plot. Plot 604 illustrates a passive frequency response of the vibration isolation system 500 and is centered about a first isolation frequency $f_2$. In other words, the plot 604 illustrates the frequency response of the vibration isolation system 500 when it is uninfluenced by the oscillatory pumping system (e.g., similar to the oscillatory pumping system being absent from the vibration isolation system 500). When the active pistons 530a and 530b are in antiphase with one another (i.e., RPA=) ±180° the fluid motion that they create cancels one another out and, therefore, leaves the passive frequency response unmodified. In this example, because the action of the active pistons 530a and 530b are equal and opposite they cancel each other. As a result, when the active pistons 530a and 530b are in antiphase with one another, the frequency response 604 of the vibration isolation system 500 is as if the system were passive, i.e., as if the active pumping of the oscillatory pumping system (e.g., via the active pistons 530a and 530b) were not present. Plot 602 illustrates a frequency response of the vibration isolation system 500 when the active pistons 530a and 530b are RPAs of: 0°<RPA<180° or −180°<RPA<0 and is configured to isolate vibrations centered about a second isolation frequency $f_1$. Plot 606 illustrates a frequency response of the vibration isolation system 500 when the active pistons 530a and 530b are in phase with one another (i.e., RPA=0°) and is configured to isolate vibrations centered about a third isolation frequency $f_3$. Plot 608 illustrates a frequency response of the vibration isolation system 500 a resulting motion of the fluid 511 produces a positive pressure that is in phase with a velocity of the tuned mass of the fluid 511 in the passage 512. The RPA of the active pistons 530a and 530b can be used to selectively displace the passive piston 510, which changes the frequency response of the vibration isolation system 500, e.g. as illustrated in the plots 602, 604, 606, and 608. In some examples, the active pistons 530a and 530b (and/or motors) operate at multiples of the first isolation frequency $f_2$ (which corresponds to the passive frequency response of the vibration isolation system 500). For example, the active pistons 530a and 530b (and/or motors) may operate at isolation frequency $f_4$ which may be defined by $f_4=f_2*n$, where n is positive integer such as 1, 2, 3, . . . etc.

Figure 7A:
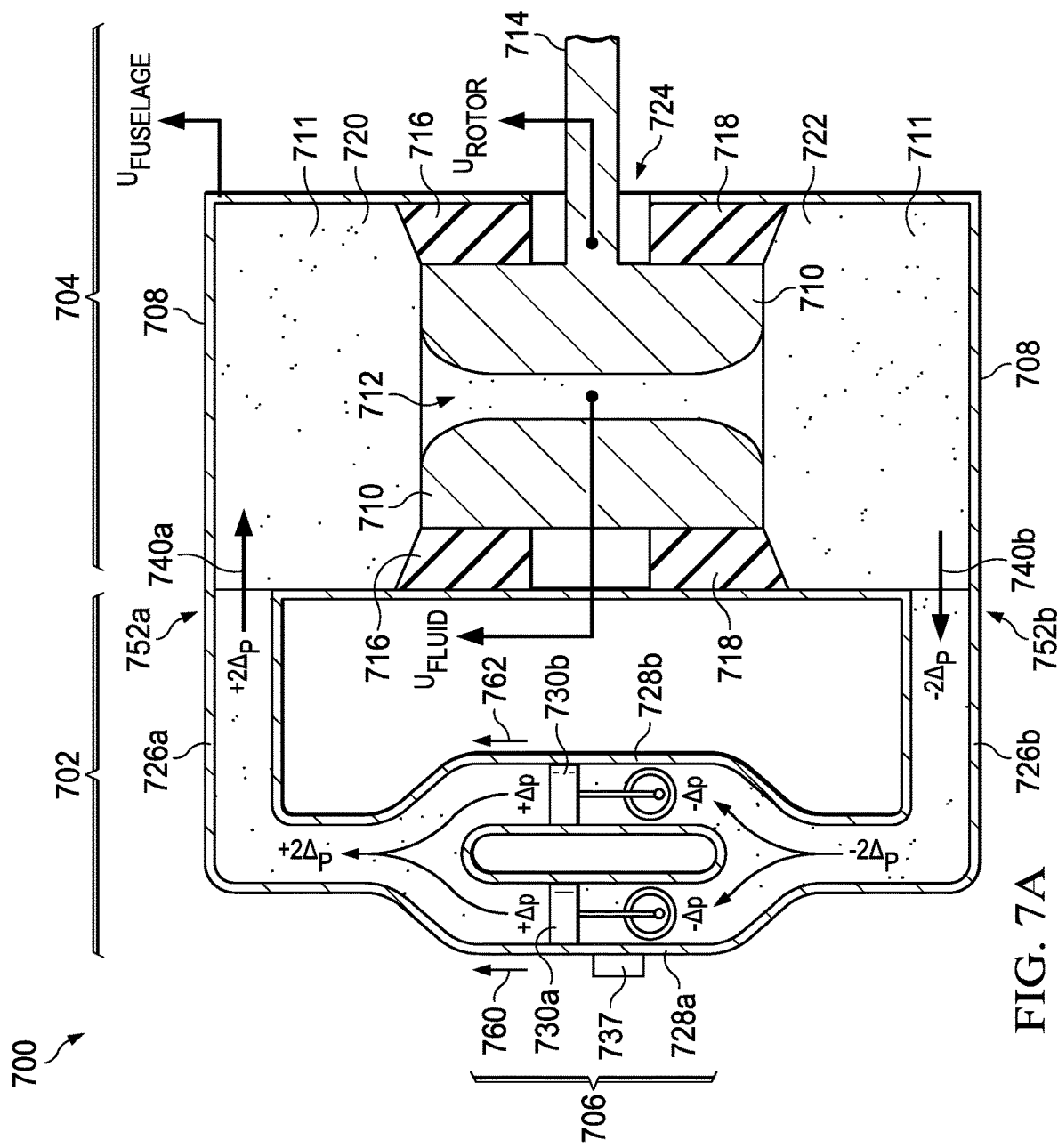
FIGS. 7A, 7B, and 7C, illustrate different operating states of a vibration isolation system, in accordance with some embodiments of the present disclosure.
Figure 7B:
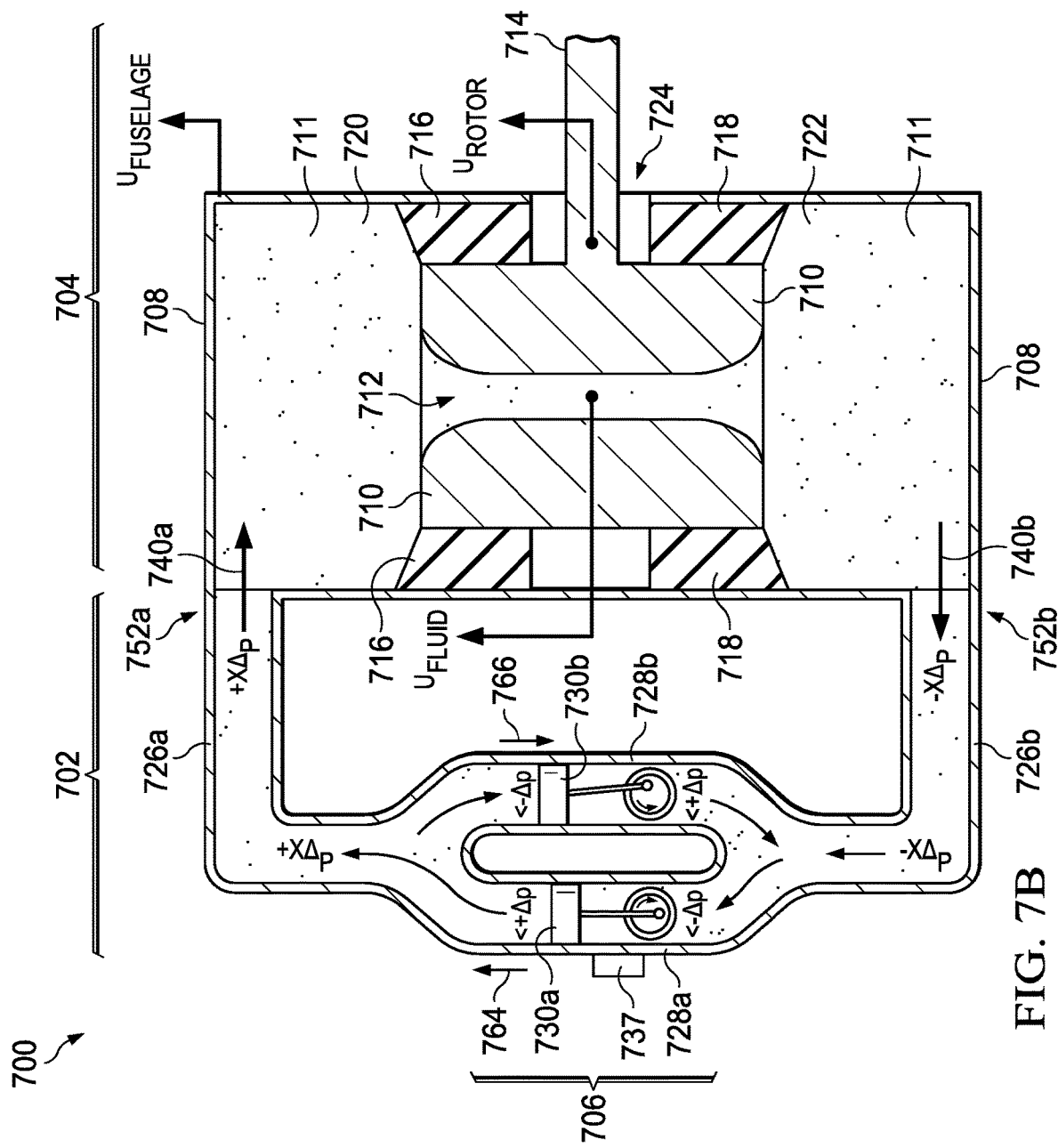
Figure 7C:
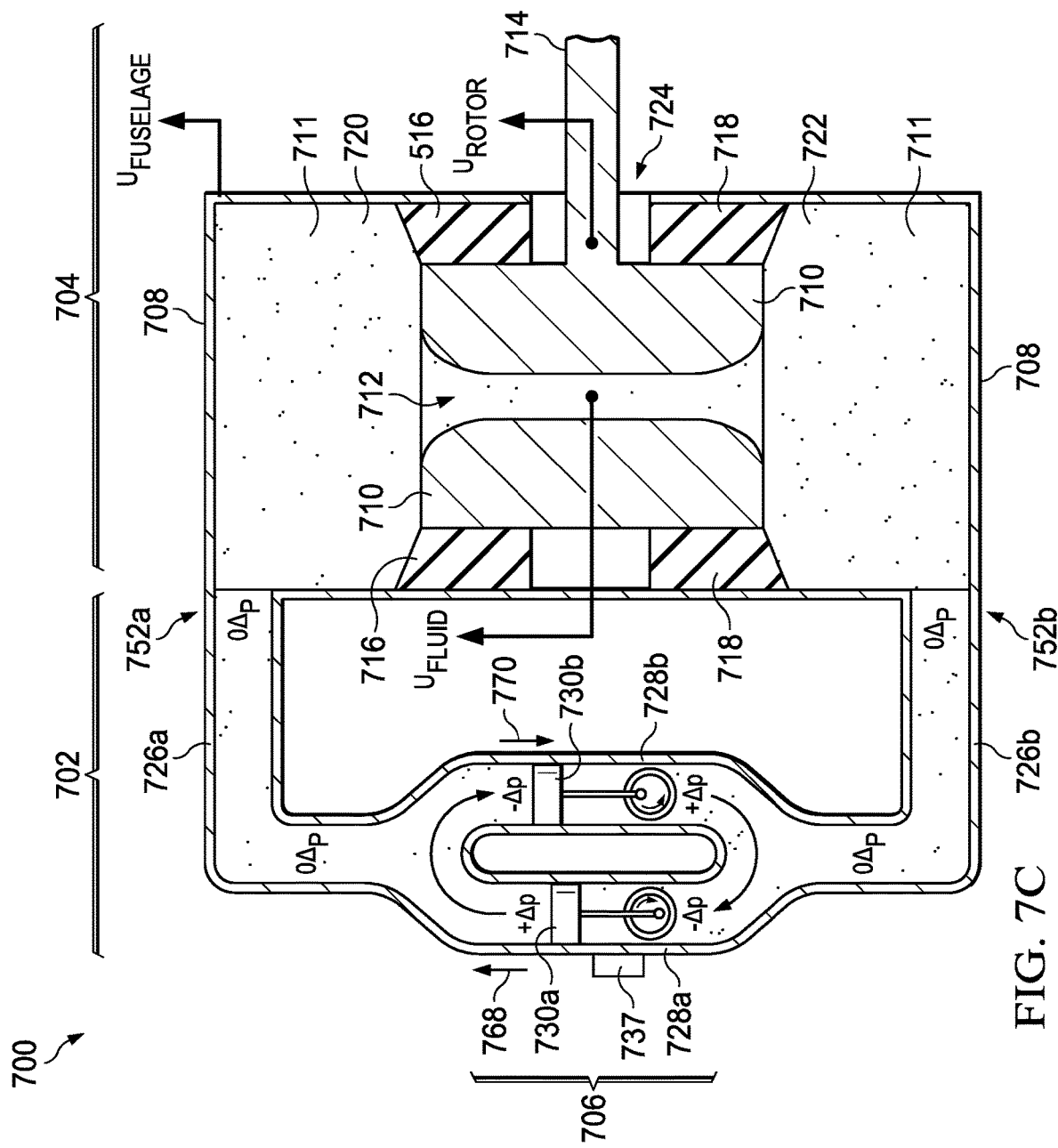
Figure 8A:
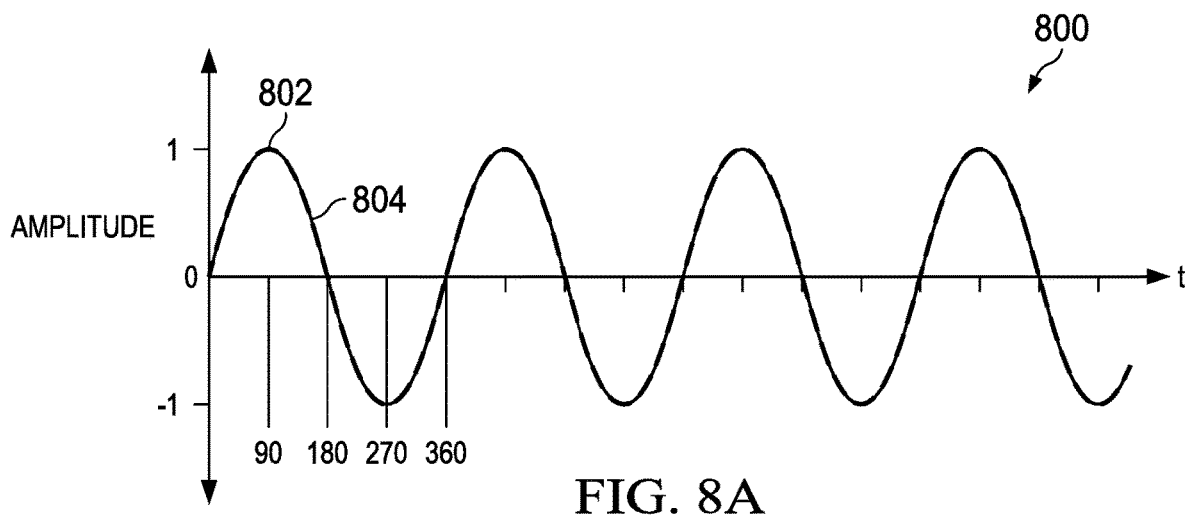
FIGS. 8A, 8B, and 8C illustrate waveforms corresponding to an oscillatory cycles of active pistons, in accordance with some embodiments of the present disclosure.
Figure 8B:
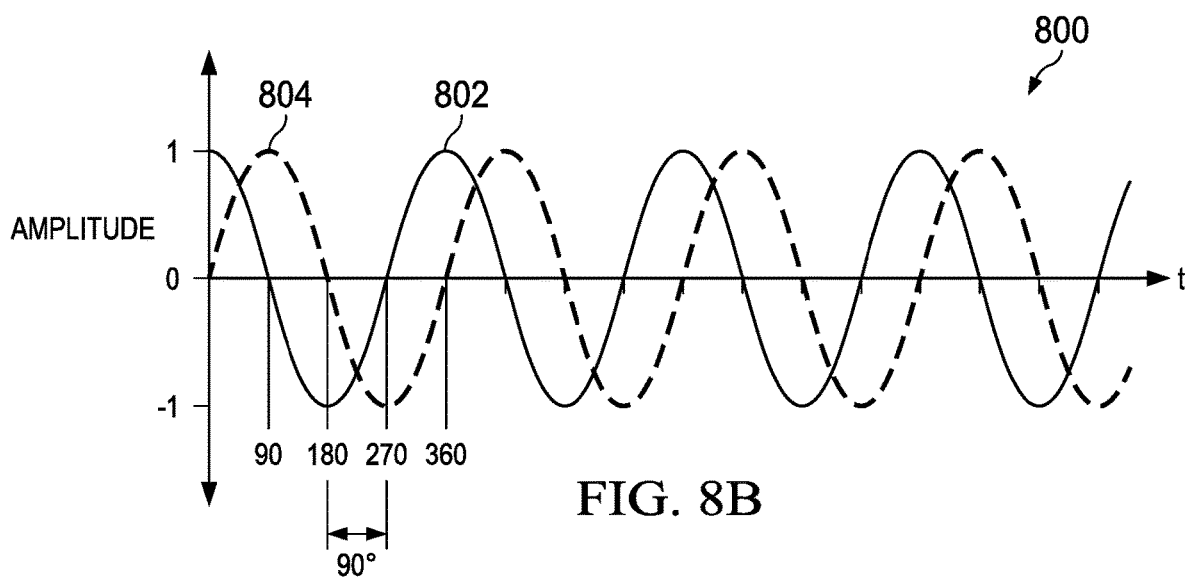
Figure 8C:
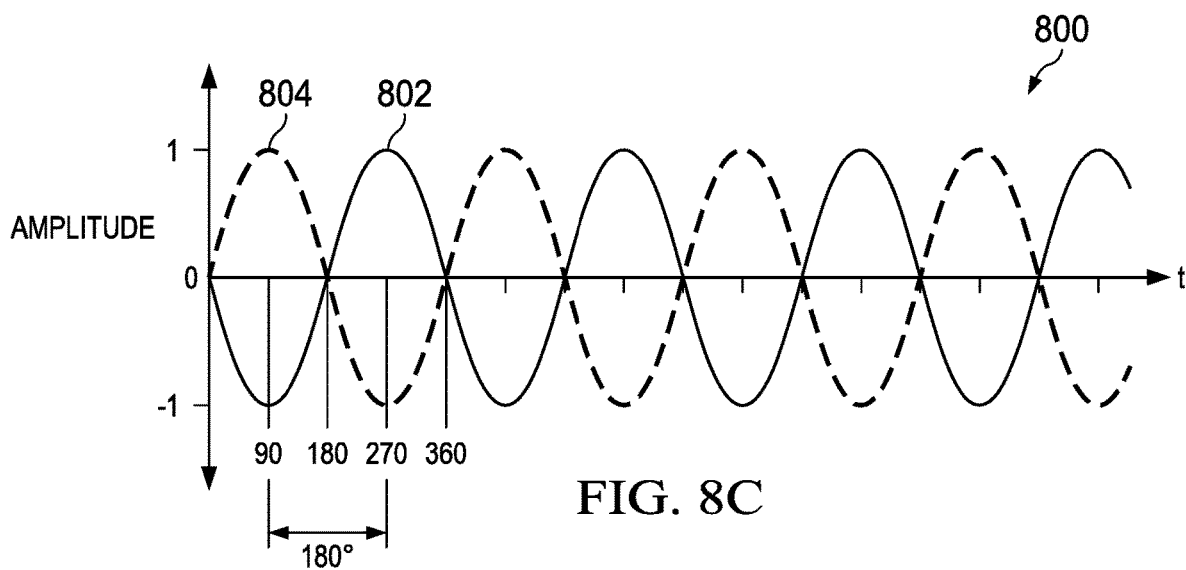

FIGS. 7A, 7B, and 7C, illustrate different operating states of a vibration isolation system 700, in accordance with some embodiments of the present disclosure. FIGS. 8A, 8B, and 8C illustrate waveforms corresponding to oscillatory cycles of the active pistons of the vibration isolation system. The vibration isolation system 700 includes an oscillatory pumping system 706, which is fluidically coupled to a liquid inertia isolator 704 by a channel assembly 702. The liquid inertia isolator 704 includes a housing 708, a passive piston 710 passive piston 710 including a passage 712, and elastomeric seals 716 and 718. A fluid chamber, which include fluid chambers 720 and 722 is defined by the interior of housing 708, the passive piston 710, and the elastomeric seals 716 and 718. Together, the passive piston 710 and the elastomeric seals 716 and 718 divide the cavity into fluid chambers 720 and 722. The fluid chamber comprises the fluid chambers 720 and 722. The channel assembly 702 includes a main channel 726 (i.e., main channel portions 726a and 726b) and branch channels 728a and 728b coupled to the main channel 726. The main channel portion 726a is in fluid communication with the fluid chamber 720 at a first end 752a of the main channel 726. The main channel portion 726b is in fluid communication with the fluid chamber 722 at a second end 752d of the main channel 726. The oscillatory pumping system 706 is disposed in the channel assembly 702. The oscillatory pumping system 706 includes active pistons 730a and 730b. The vibration isolation system 700 of FIGS. 7A, 7B, and 7C includes components as described with respect to vibration isolation system 500 of FIGS. 5A, 5B, and 5C. The details of and operation of many components are not repeated here only for the sake of brevity. The active pistons 730a and 730b are oscillating at the same frequency. For example, each may oscillate at 1-, 2-, 3-, 4-, 5-, etc. or N-per-rev.

FIG. 7A illustrates the vibration isolation system when the active pistons 730a and 730b are in phase with one another. FIG. 8A illustrates waveforms corresponding to the FIG. 7A. The active pistons 730a and 730b are at their minimum stroke point. From the minimum stroke (i.e., their maximum down stroke), the active pistons 730a and 730b are moving up (as indicated by arrows 760 and 762) in the branch channel 728a and 728b, respectively, which creates a positive pressure difference +Δp above the active pistons 730a and 730b and an equal negative pressure difference −Δp below the active pistons 730a and 730b in the branch channels 728a and 728b.

The local pressures in each of branch channels 728a and 728b combine to generate a pressure difference in the main channel 726. In this case, the positive pressure differences +Δp combine to generate a positive pressure difference +2Δp in the main channel portion 726a, which causes a corresponding positive pressure difference +2Δp at the first end 752a of the main channel. The positive pressure difference +2Δp the first end 752a forces the fluid 711 from the first end 752a into the fluid chamber 720. Similarly, the negative pressure differences −Δp combine to generate a negative pressure difference −2Δp in the main channel portion 726b, which causes a corresponding negative pressure difference −2Δp at the second end 752b of the main channel. The negative pressure difference −2Δp at the second end 752b forces the fluid 711 from the fluid chamber 722 into the second end 752b. The FIG. 8A shows amplitude versus phase angle for several overlapping plots. Plot 804 corresponds to the active piston 730a. Plot 802 corresponds to the active piston 730b. Because the active pistons 730a and 730b are in phase, the plots overlap one another. The sum of the two plots is a waveform of amplitude equal to two, which corresponds to the 2× pressure difference, i.e., ±2Δp.

FIG. 7B illustrates the vibration isolation system when the active pistons 730a and 730b are out of phase with one another and not in antiphase with one another. FIG. 8B illustrates waveforms corresponding to the FIG. 7B. The active piston 730a at its minimum stroke point. The active piston 730b is between its minimum stroke point and maximum stroke point (i.e., maximum up stroke). From the minimum stroke, the active piston 730a is moving up (as indicated by arrow 764) in the branch channel 728a, which creates a positive pressure difference +Δp above the active piston 730a and an equal negative pressure difference −Δp below the active piston 730a in the branch channel 728a. From its current point, the active piston 730b is moving down (as indicated by arrow 766) in the branch channel 728b, which creates a negative pressure difference of less than −Δp above the active piston 730b and an equal positive pressure difference of less than +Δp below the active piston 730b in the branch channel 728b.

The local pressures in each of the branch channels 728a and 728b combine to generate a pressure difference in the main channel 726. In this case, the positive pressure difference +Δp and the negative pressure difference of less than −Δp sum to generate a positive pressure difference +xΔp in the main channel portion 726a, which causes a corresponding positive pressure difference +xΔp at the first end 752a of the main channel. X varies between zero and two according to the sum of the waveforms, i.e., 0<x<2. The positive pressure difference +xΔp the first end 752a forces the fluid 711 into the fluid chamber 720. Similarly, the pressure differences on an opposite side of the active pistons 730a and 730b result in a negative pressure difference −xΔp at the second end 752b, which forces the fluid 711 from the fluid chamber 722 into the second end 752b. The FIG. 8B shows amplitude versus phase angle for several overlapping plots. Plot 804 corresponds to the active piston 730a. Plot 802 corresponds to the active piston 730b. Because the active pistons 730a and 730b are out of phase, the plots are shifted relative to one another.

FIG. 7C illustrates the vibration isolation system when the active pistons 730a and 730b are in antiphase with one another. FIG. 8C illustrates waveforms corresponding to the FIG. 7C. The active piston 730a at its minimum stroke point. The active piston 730b is at its maximum stroke point. From the minimum stroke, the active piston 730a is moving up (as indicated by arrow 768) in the branch channel 728a, which creates a positive pressure difference +Δp above the active piston 730a and an equal negative pressure difference −Δp below the active piston 730a in the branch channel 728a. From its maximum stroke point, the active piston 730b is moving down (as indicated by arrow 770) in the branch channel 728b, which creates a negative pressure difference −Δp above the active piston 730b and an equal positive pressure difference +Δp below the active piston 730b in the branch channel 728b.

The local pressures in each of the branch channels 728a and 728b combine to generate a net of zero pressure difference in the main channel 726. In this case, the positive pressure difference +Δp and the negative pressure difference −Δp combine and cancel each other out, which causes a zero pressure difference 0Δp in the main channel 726. The fluid simply cycles between the branch channels 728a and 728b and does not exert any force or displacement on the fluid chambers 720 and 722. The FIG. 8C shows amplitude versus phase angle for several overlapping plots. Plot 804 corresponds to the active piston 730a. Plot 802 corresponds to the active piston 730b. Because the active pistons 730a and 730b are in antiphase, the plots are 180 degrees out of phase with one another. The sum of the two plots is a waveform of amplitude equal to 0, which corresponds to the zero pressure difference in the channels.

Figure 9:
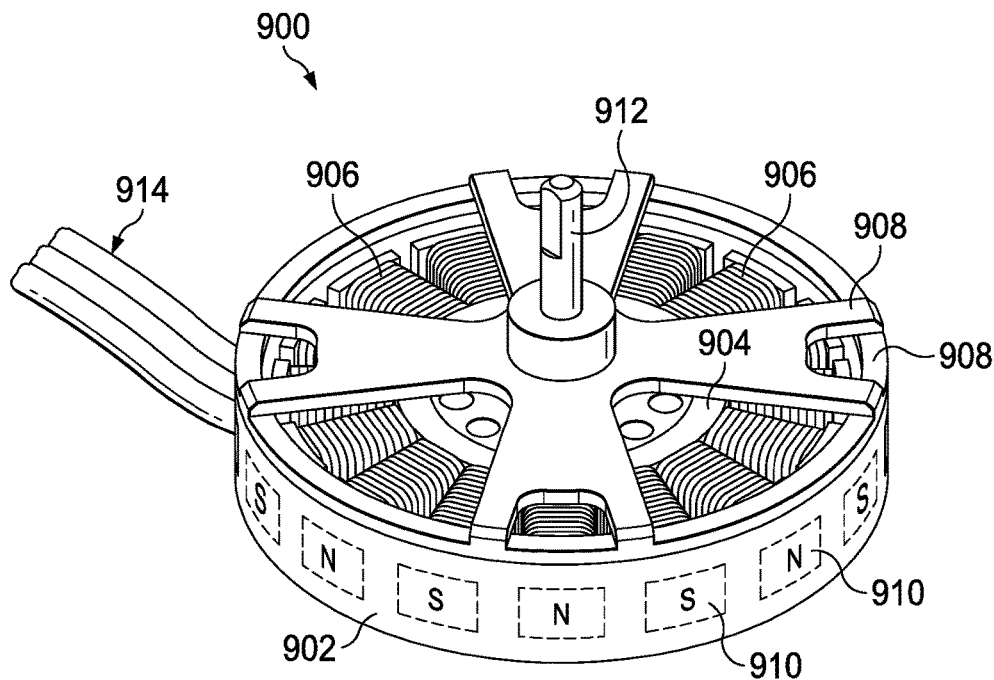
FIG. 9 illustrates a motor, in accordance with some embodiments of the present disclosure.

FIG. 9 illustrates a motor 900, in accordance with some embodiments of the present disclosure. The motor 900 is an example of a motor that may be used in any of the oscillatory pumping systems of the present disclosure. The motor 900 includes a housing 902, a stator 904, a rotor 908, driveshaft 912, and wires 914. The housing 902 supports the other components. The housing 902 is not fluid-sealed. The stator 904 includes electromagnets 906. Each of the electromagnets 906 includes magnetic core and a coil wound around the magnetic core. The rotor 908 includes permanent magnets 910, which alternate in polarity (e.g., N, S, N, etc.). The driveshaft 912 is fixed to the rotor 908. The rotor 908 is operable to rotate relative to the stator 904 based on magnetic interactions between the plurality of permanent magnets and the plurality of electromagnets. The electromagnets 906 are switched on and off in alternating polarities to create magnetic fields that attract and repel the permanent magnets on the rotor 908, which drive its motion. Neither the rotor 908 nor the housing 902 encloses the electromagnets 906 or the internal circuits of the motor 900. Thus, when submerged in a fluid the electromagnets 906 and/or the internal circuits of the motor 900 contact with the fluid. Some other systems rely on creating dry locks (e.g., between pistons or walls) in which the motor can operating without being in direct contact with the fluid. Advantageously, the motor 900 being submerged in and in direct contact with the fluid enables the motor 900 to operate at high operational speeds without concern of overheating the electromagnets 906 or the internal circuits the due to the direct cooling provided by the fluid. The fluid can be used simultaneously to adjust operational characteristics of a liquid inertia isolator (e.g., based on the motion of the fluid) and to cool the motor 900 (e.g., based on the motor 900 being submerged in the fluid). The motor 900 is an example of a servomotor and/or a brushless motor.

Figure 10:
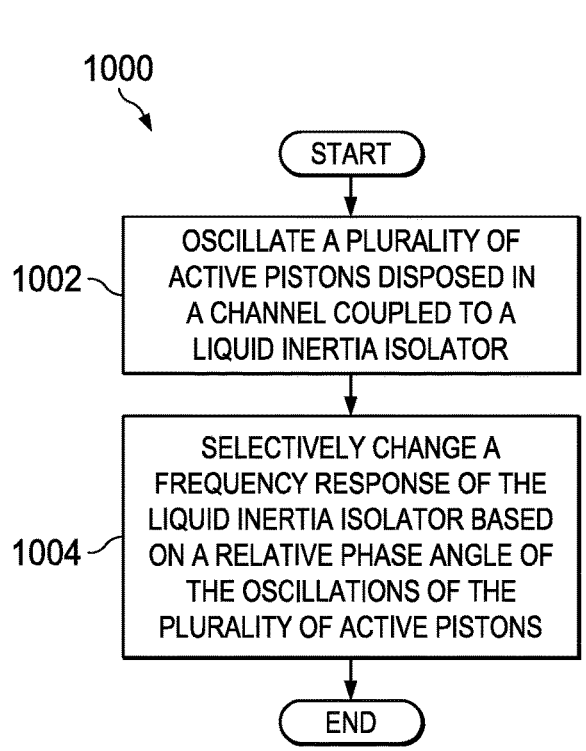
FIGS. 10 and 11 illustrate methods, in accordance with some embodiments of the present disclosure.

FIG. 10 illustrates a method 1000 according to some embodiments of the present disclosure. The method 1000 may begin at 1002 by oscillating a plurality of active pistons disposed in a channel coupled to a liquid inertia isolator. The method 1000 may terminate at 1004 by selectively changing a frequency response of the liquid inertia isolator is based on a relative phase angle (RPA) of the oscillations of the plurality of active pistons. In some embodiments, one or more portions of the method 1000 may repeat, e.g., in a loop.

Some embodiments of the present disclosure utilize two active pistons to selectively adjust the frequency response of a liquid inertia isolator based on adjusting an RPA between the two active pistons. However, embodiments of the present disclosure are not limited to such implementations. Any number of active pistons may be used. Indeed, some embodiments of the present disclosure utilize a single active piston to selectively adjust the frequency response of the liquid inertia isolator based on adjusting an RPA between two motors that drive the single active piston, for example, as described below with respect to FIGS. 11, 12A, 12B, and 12C.

Figure 11:
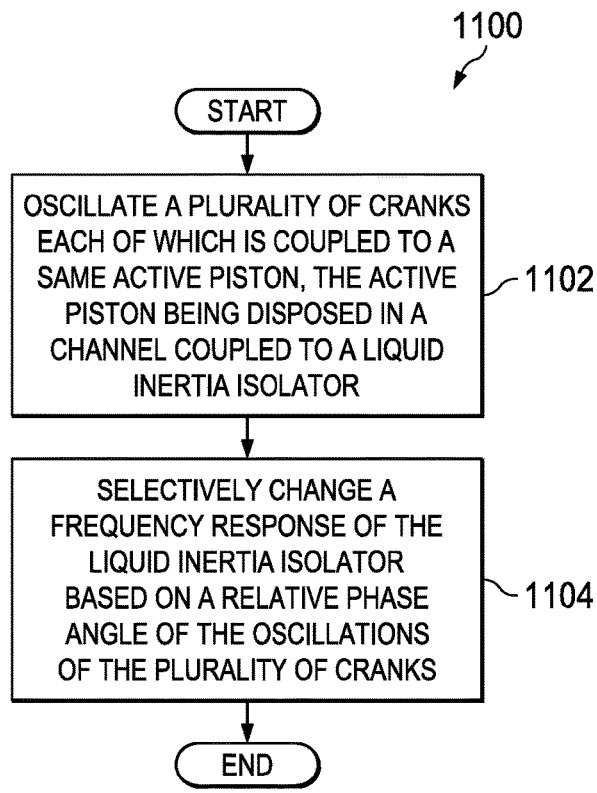

FIG. 11 illustrates a method 1100 according to some embodiments of the present disclosure. The method 1100 may begin at 1102 by oscillating a plurality of cranks each of which is coupled to a same active piston. The active piston is disposed in a channel coupled to a liquid inertia isolator. The method 1100 may terminate at 1104 by selectively changing a frequency response of the liquid inertia isolator is based on a relative phase angle of the oscillations of the plurality of cranks. In some embodiments, one or more portions of the method 1100 may repeat, e.g., in a loop.

Figure 12A:
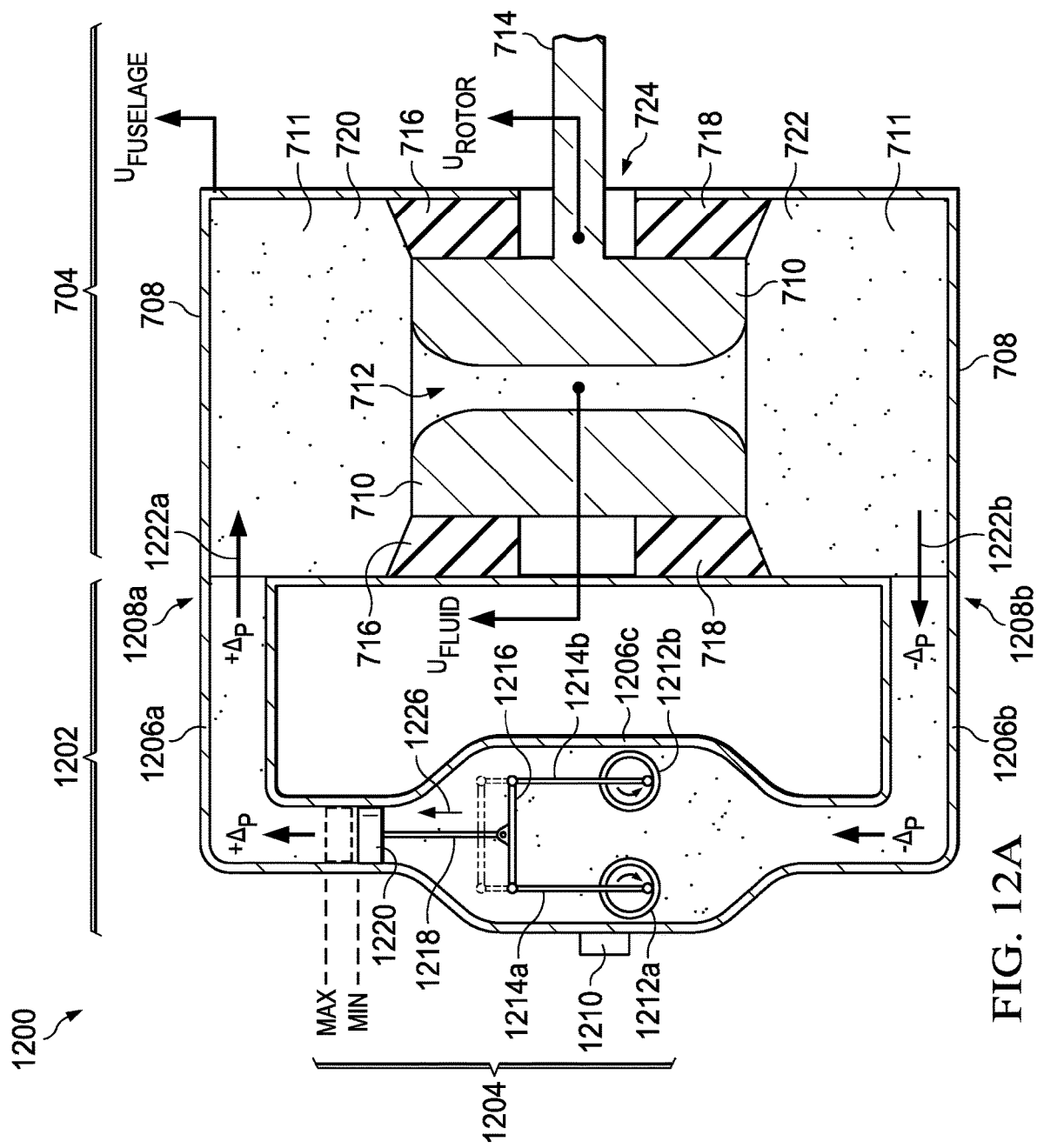
FIGS. 12A, 12B, and 12C illustrate different operating states of a vibration isolation system 1200, in accordance with some embodiments of the present disclosure.
Figure 12B:
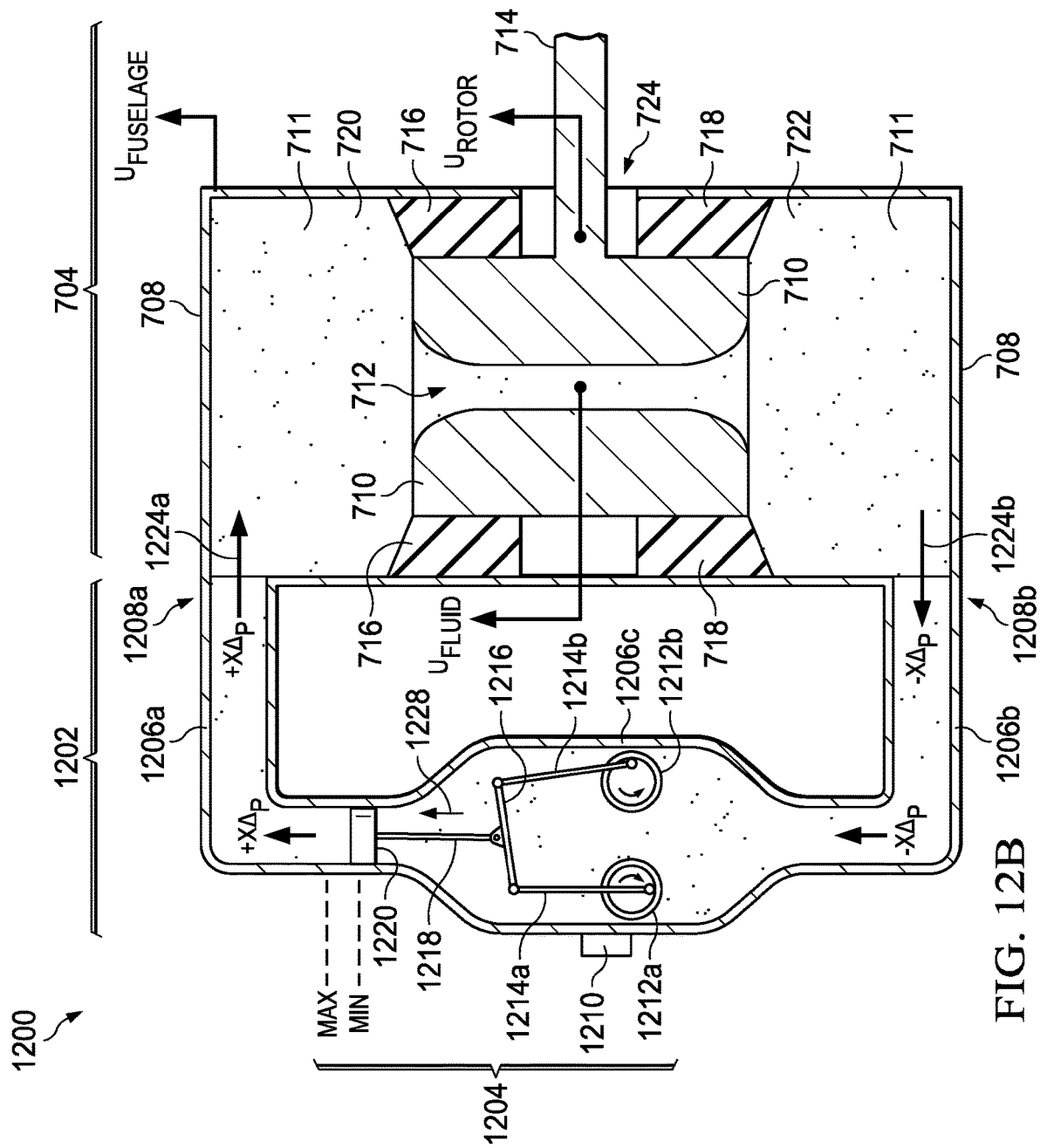
Figure 12C:
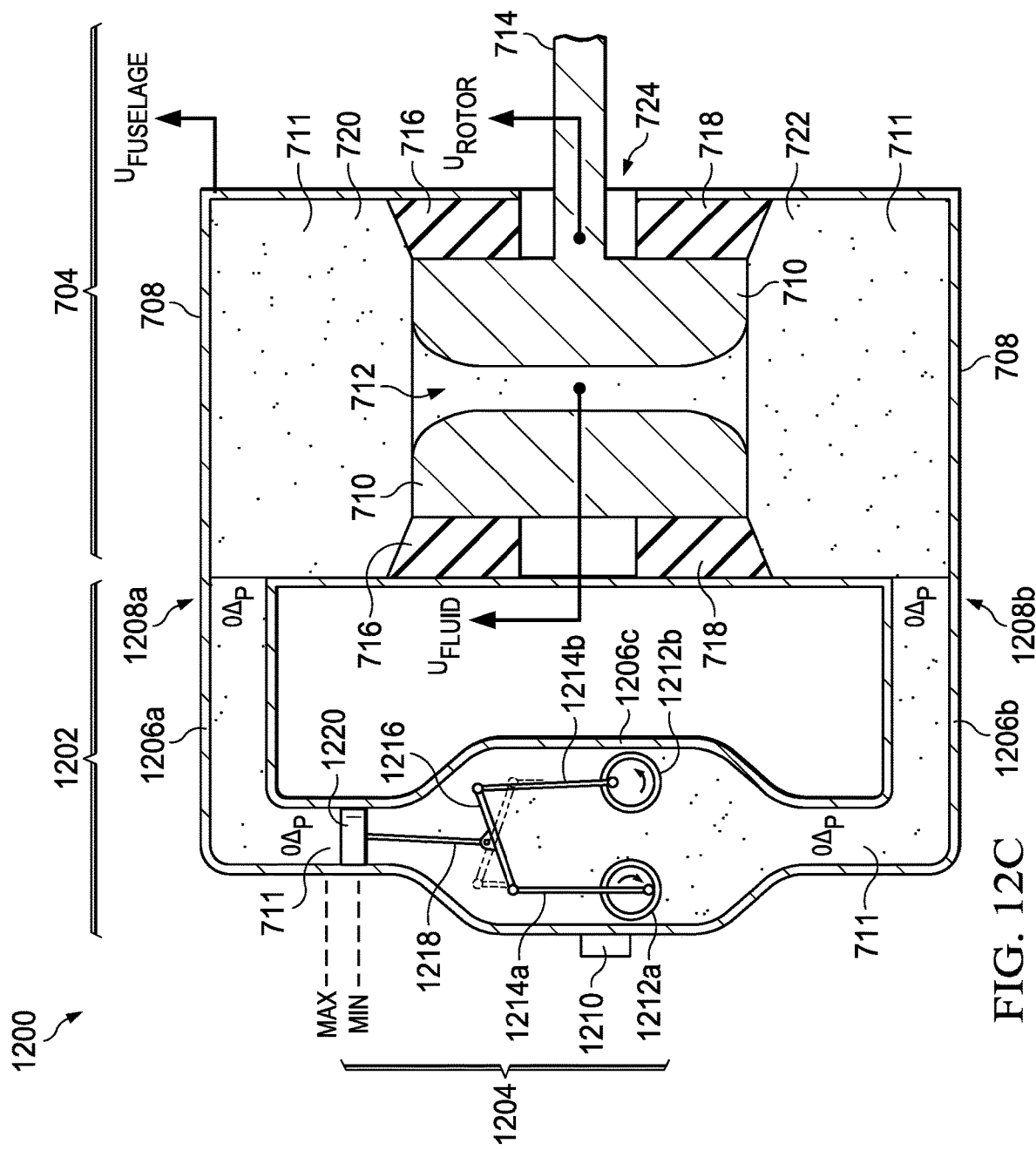

FIGS. 12A, 12B, and 12C illustrate different operating states of a vibration isolation system 1200, in accordance with some embodiments of the present disclosure. The system 1200 implements the method 1100. Though the waveforms of FIGS. 8A, 8B, and 8C are described above in relation to oscillatory cycles of two active pistons, the waveforms may also represent oscillatory cycles of two motors, as will be described with respect to the FIGS. 12A, 12B, and 12C. The vibration isolation system 1200 includes an oscillatory pumping system 1204, which is fluidically coupled to a liquid inertia isolator 704 by a channel assembly 1202. The liquid inertia isolator 704 includes a housing 708, a passive piston 710 passive piston 710 including a passage 712, and elastomeric seals 716 and 718. A fluid chamber, which include fluid chambers 720 and 722 is defined by the interior of housing 708, the passive piston 710, and the elastomeric seals 716 and 718. Together, the passive piston 710 and the elastomeric seals 716 and 718 divide the cavity into fluid chambers 720 and 722. The fluid chamber comprises the fluid chambers 720 and 722. The channel assembly 1202 includes end channel portions 1206a and 1206b, which are coupled to a mid-channel portion 1206c. The end channel portion 1206a is in fluid communication with the fluid chamber 720 at a first end 1208a of the channel assembly 1202. The end channel portion 1206b is in fluid communication with the fluid chamber 722 at a second end 1208d of the channel assembly 1202. The vibration isolation system 1200 of FIGS. 12A, 12B, and 12C includes components as described with respect to vibration isolation systems 500 and 700 of FIGS. 5A, 5B, 5C, 7A, 7B, and 7C. The details and operation of many components are not repeated here only for the sake of brevity.

The oscillatory pumping system 1204 is disposed in the channel assembly 1202. The oscillatory pumping system 1204 includes a controller 1210, motors 1212a and 1212b, and an active piston 1220. Each of the motors 1212a and 1212b includes a shaft, wires, a sensor, a processing unit, flywheels, and cranks e.g., as described with respect to the motors 538a and 538b of FIGS. 5A and 5B. Linkages including connecting rods 1214a, 1214b, 1216, and 1218, operably couple the motors 1212a and 1212b and the active piston 1220. The motors 1212a and 1212b selectively drive oscillation of the active piston 1220 via the linkages based on an RPA between the motors 1212a and 1212b. The connecting rods 1214a and 1214b are pivotally coupled to the motors 1212a and 1212b, respectively at one end and, at an opposite end, are pivotally attached to the connecting rod 1216. The connecting rods 1214a and 1214b support the connecting rod 1216. The connecting rod 1218 is pivotally coupled to a center point of the connecting rod 1216. The connecting rod 1216 supports the connecting rod 1218. The connecting rod 1218 is pivotally attached to the piston 1220. Each of the motors 1212a and 1212b may oscillate at a same frequency. For example, each may oscillate at 1-, 2-, 3-, 4-, 5-, etc. or N-per-rev and may be the same or different from the tuned frequency of the liquid inertia isolator.

FIG. 12A illustrates the vibration isolation system 1200 when the motors 1212a and 1212b are in phase with one another. FIG. 8A illustrates waveforms corresponding to the FIG. 12A. The motors 1212a and 1212b are illustrated at their minimum crank position, which corresponds to the linkages being at a minimum vertical position and the piston 1220 being at minimum stroke position, as illustrated in solid lines. From the minimum crank position, the motors 1212a and 1212b are simultaneously moving up the connecting rods 1214a and 1214b, which moves up the connecting rod 1218 (as indicated by arrow 1226) to their maximum vertical position and the active piston 1220 to its at maximum stroke position, as illustrated in dashed lines. Because oscillations of the motors 1212a and 1212b are in phase with one another, the oscillation of the active piston 1220 is at its maximum amplitude. The upward movement of the active piston 1220 creates a positive pressure difference +Δp above the piston 1220 and an equal negative pressure difference −Δp below the active piston 1220 in the channel assembly 1202. Pressures in the channels can force the fluid 711 to and from the fluid chambers 720 and 722, which can alter the frequency response of the liquid inertia isolator 704. The positive pressure difference +Δp at the first end 1208a forces the fluid 711 from the first end 1208a into the fluid chamber 720, as generally indicated by 1222a. Similarly, the negative pressure difference −Δp at the second end 1208b forces the fluid 711 from the fluid chamber 722 into the second end 1208b, as generally indicated by 1222b. The FIG. 8A shows amplitude versus phase angle for several overlapping plots. Plot 804 corresponds to the motor 1212a. Plot 802 corresponds to the motor 1212b. Because the motors 1212a and 1212b are in phase, the plots overlap one another. When the motors 1212a and 1212b oscillate in phase with one another (i.e., RPA=0°) such as in FIG. 12A, the active piston 1220 produce a maximum net pressure difference in the channel assembly 1202 and, therefore, forces the fluid 711 to oscillate between the fluid chambers 720 and 722 at maximum amplitude. This can be used to maximize the of that the oscillatory pumping system 1204 on the frequency response of the liquid inertia isolator 704.

FIG. 12B illustrates the vibration isolation system 1200 when the motors 1212a and 1212b are out of phase with one another and not in antiphase with one another. FIG. 8B illustrates waveforms corresponding to the FIG. 12B. The motor 1212a is at its minimum crank position. The motor 1212b is between its minimum crank position and maximum crank position. As the motors 1212a and 1212b move up from their respective positions, they simultaneously move up the connecting rods 1214a and 1214b, which moves up the connecting rod 1218 (as indicated by arrow 1228) and the active piston 1220. Because oscillations of the motors 1212a and 1212b are out of phase with one another, the active piston 1220 does not reach its maximum movement during oscillation. Instead, the motors 1212a and 1212b being out of phase with one another causes the connecting rod 1216 to slope toward one of the motors 1212a and 1212b and, thereby, prevents the connecting rod 1218 and the active piston 1220 from reaching their maximum upward movement. The upward movement of the active piston 1220 creates a positive pressure difference of +xΔp above the active piston 1220 and an equal negative pressure difference of −xΔp below the active piston 1220 in the channel assembly 1202. In this example, 0<x<1 and 1 corresponds to maximum displacement of the active piston 1220. The positive pressure difference +xΔp at the first end 1208a forces the fluid 711 from the first end 1208a into the fluid chamber 720, as generally indicated by 1222a. Similarly, the negative pressure difference −xΔp at the second end 1208b forces the fluid 711 from the fluid chamber 722 into the second end 1208b, as generally indicated by 1222b. The FIG. 8B shows amplitude versus phase angle for several overlapping plots. Plot 804 corresponds to the motor 1212a. Plot 802 corresponds to the motor 1212b. Because the motors 1212a and 1212b are out of phase, the plots are shifted relative to one another.

When the resulting motion of the fluid 711 ($u_{fluid}$) produces a positive change in pressure +XΔp that is counter to, i.e., out of phase with, the acceleration of the tuned mass of the fluid 711 within the passage 712, the frequency response of the liquid inertia isolator 704 simulates a system with the tuning mass having more inertia. This results in the liquid inertia isolator 704 having a first frequency response that has a lower isolation frequency than the isolation frequency of the passive frequency response of the liquid inertia isolator 704. When the resulting motion of the fluid 711 produces negative pressure −XΔp that is in phase with the acceleration of the tuned mass of the fluid 711 within the passage 712, the frequency response of the liquid inertia isolator 704 simulates a system with the tuning mass having less inertia. This results in the liquid inertia isolator 704 having a frequency response that has a higher isolation frequency than the isolation frequency of the passive frequency response. When the resulting motion of the fluid 711 produces positive pressure +XΔp that is in phase with the velocity of the tuned mass of the fluid 511 in the passage 512, the frequency response simulates a system with less damping. This results in the liquid inertia isolator 704 having a frequency response that has a deeper valley of isolation and less transmissibility at the isolation frequency than the passive frequency response.

FIG. 12C illustrates the vibration isolation system when the motors 1212a and 1212b are in antiphase with one another. FIG. 8C illustrates waveforms corresponding to the FIG. 12c. The motor 1212a is at its minimum crank position. The motor 1212b is at its maximum crank position. The motor 1212a is moving up from its minimum crank position. The motor 1212b is moving down from its maximum crank position. Because the movements of the motor 1212a and the motor 1212b are equal and opposite to one another, they cancel one another. In other words, a vertical position of the center point of the bar 1216 remains stationary as the motors 1212a and 1212b oscillate out of phase with one another. Thus, the active piston 1220 remains stationary and, therefore, produces no pressure difference in the channel assembly 1202. The FIG. 8C shows amplitude versus phase angle for several overlapping plots. Plot 804 corresponds to the motor 1212a. Plot 802 corresponds to the motor 1212b. Because the motors 1212a and 1212b are in antiphase, the plots are 180 degrees out of phase with one another. Oscillating the motors 1212a and 1212b in antiphase with one another (i.e., RPA=±180° such as in FIG. 12C, causes the active piston 1220 to produces zero net pressure difference in the channel assembly 1202 and, therefore, fails to produce any oscillation of the fluid 511 between the fluid chambers 520 and 522. The resulting frequency response of the liquid inertia isolator 704 remains unchanged from the passive frequency response.

Figure 13:
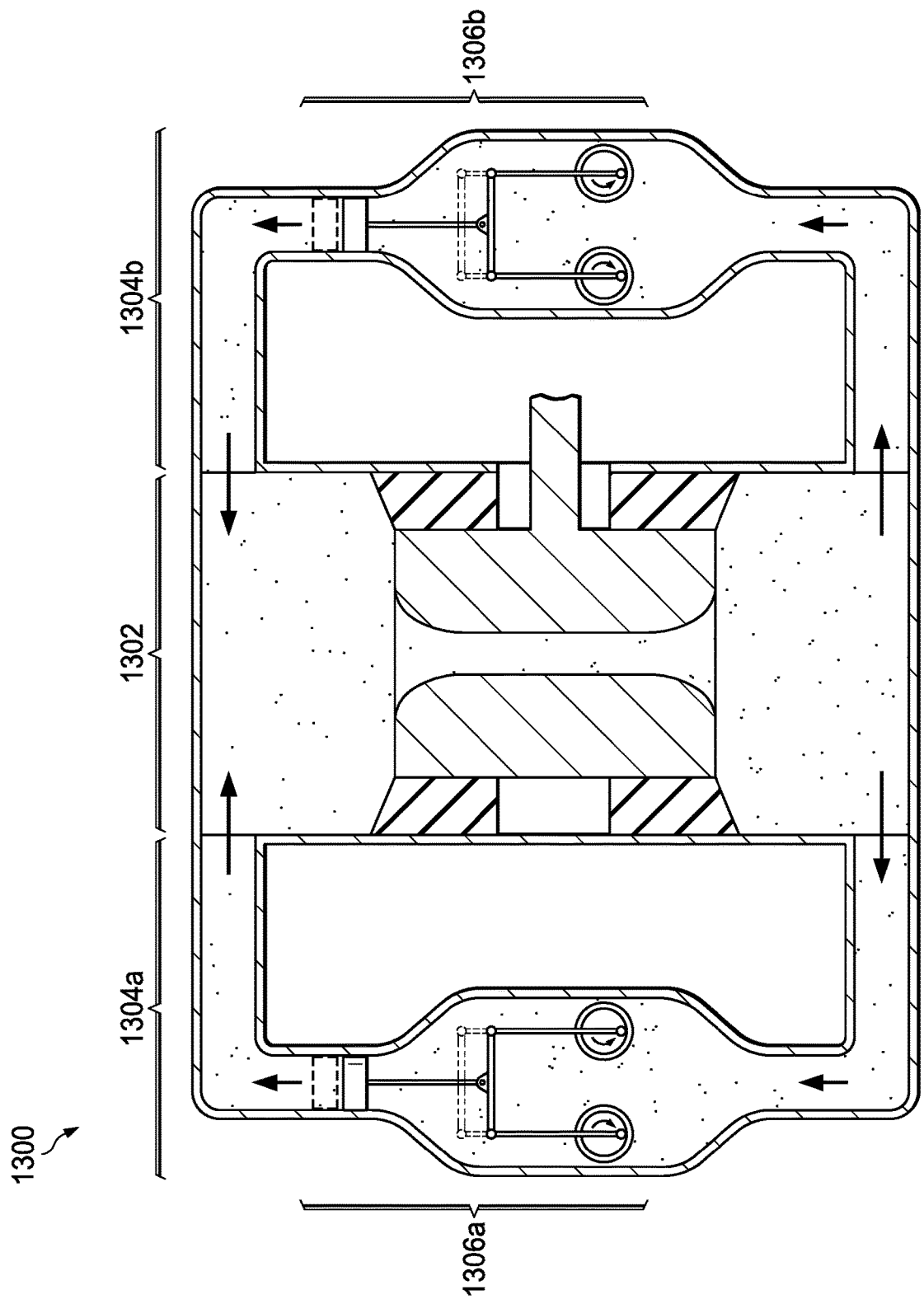
FIGS. 13, 14, 15, and 16 illustrate vibration isolation systems including multiple oscillatory pumping systems, in accordance with some embodiments of the present disclosure.

While some vibration isolation systems of the present disclosure include only a single oscillatory pumping system, embodiments of the present disclosure are not limited to such. Indeed, a vibration isolation system of the present disclosure may include multiple oscillatory pumping systems. For example, FIGS. 13, 14, 15, and 16 illustrate vibration isolation systems including multiple oscillatory pumping systems, in accordance with some embodiments of the present disclosure. FIG. 13 illustrates a vibration isolation system 1300. The vibration isolation system 1300 includes a liquid inertia isolator 1302, an oscillatory pumping system 1306a disposed in a channel assembly 1304a, and an oscillatory pumping system 1306b disposed in a channel assembly 1304b. Each of the oscillatory pumping systems 1306a and 1306b may operate as described with respect to FIGS. 12A, 12B, and 12C. In addition, each of the oscillatory pumping systems 1306a and 1306b may operate in phase, out of phase, or in antiphase with one another to selectively change the frequency response of a passive piston. When the oscillatory pumping systems 1306a and 1306b operate in phase with one another, an active piston in each of the oscillatory pumping systems 1306a and 1306b produce a maximum net pressure difference in the channel assemblies 1304a and 1304 and, therefore, forces fluid to oscillate between fluid chambers of the liquid inertia isolator 1302 at maximum amplitude. This can be used to maximize the influence the oscillatory pumping systems 1306a and 1306b on the frequency response of the liquid inertia isolator 1302. When the oscillatory pumping systems 1306a and 1306b operate in antiphase with one another, the movement of fluid cause by each of the oscillatory pumping systems 1306a and 1306b may cancel the other. This produces zero net pressure difference in the fluid chambers and, therefore, leaves the frequency response of the liquid inertia isolator 1304 unaltered. The oscillatory pumping systems 1306a and 1306b can be tuned to operate out of phase with one another and not in antiphase with one another, to tune the frequency response of the liquid inertia isolator 1302 to a desired level between the in phase and antiphase levels.

Figure 19:
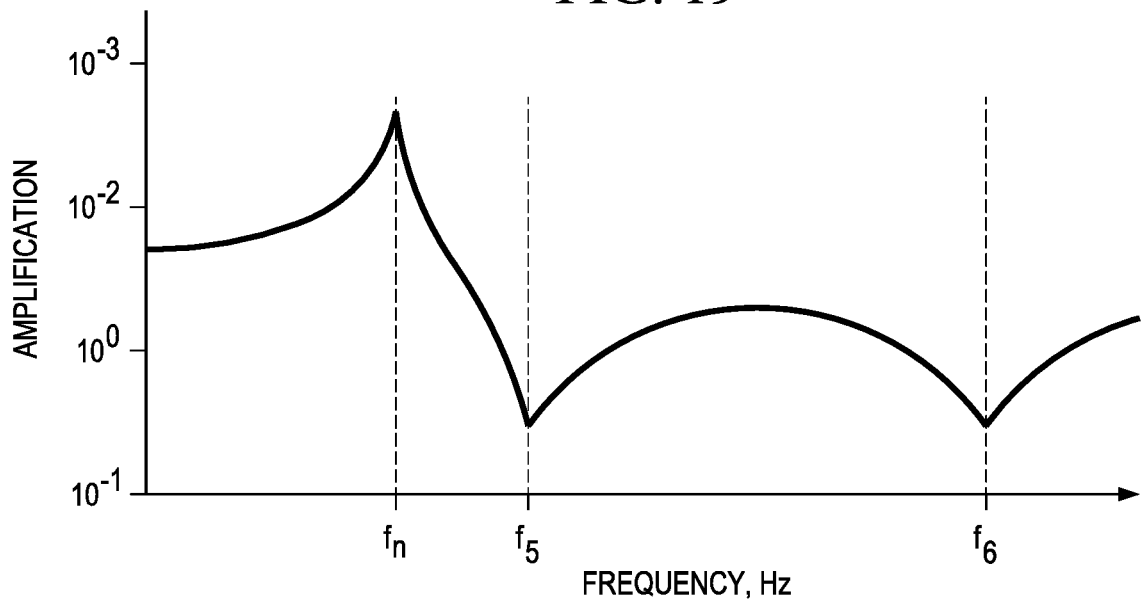
FIG. 19 illustrates a plot of a frequency response based on two oscillatory pumping systems operating at different operational frequencies, in accordance with some embodiments of the present disclosure.

The oscillatory pumping systems 1306a and 1306b may operate at a same operational frequency or may operate at different operational frequencies. For example, when each of the oscillatory pumping systems 1306a and 1306b operate at a same operational frequency, their combined influence on the frequency response of a liquid inertia isolator will be similar to that describe with respect to FIG. 6. When the oscillatory pumping systems 1306a and 1306b operate at different operational frequencies, their combined influence on the frequency response of a liquid inertia isolator may be, e.g., as illustrated in FIG. 19. FIG. 19 illustrates a plot of a single frequency response that peaks at the natural frequency $f_n$, and has multiple isolation frequency ranges around frequencies $f_5$ and $f_6$. For example, the oscillatory pumping system 1306a may operate at the frequency $f_5$, and the oscillatory pumping system 1306b may operate at the frequency $f_6$. Because each of the oscillatory pumping systems 1306a and 1306b isolates a range of frequencies centered around its corresponding operational frequency, the frequency response includes two isolation ranges centered around the operational frequencies $f_5$ and $f_6$. As an illustrative example, an aircraft that includes a counterrotating two-blade system may produce harmonics at both 2-per-rev and 4-per-rev. In such an example, the frequency $f_5$ may correspond to 2-per-rev (i.e., the oscillatory pumping system 1306a operates at 2-per-rev) and the frequency $f_6$ may correspond to 4-per-rev (i.e., the oscillatory pumping system 1306b operates at 4-per-rev). Thus, each of the oscillatory pumping systems 1306a and 1306b may help isolate harmonics in different frequency bands, which can mitigate vibrations produced by interactions between different blades on rotor systems.

Figure 14:
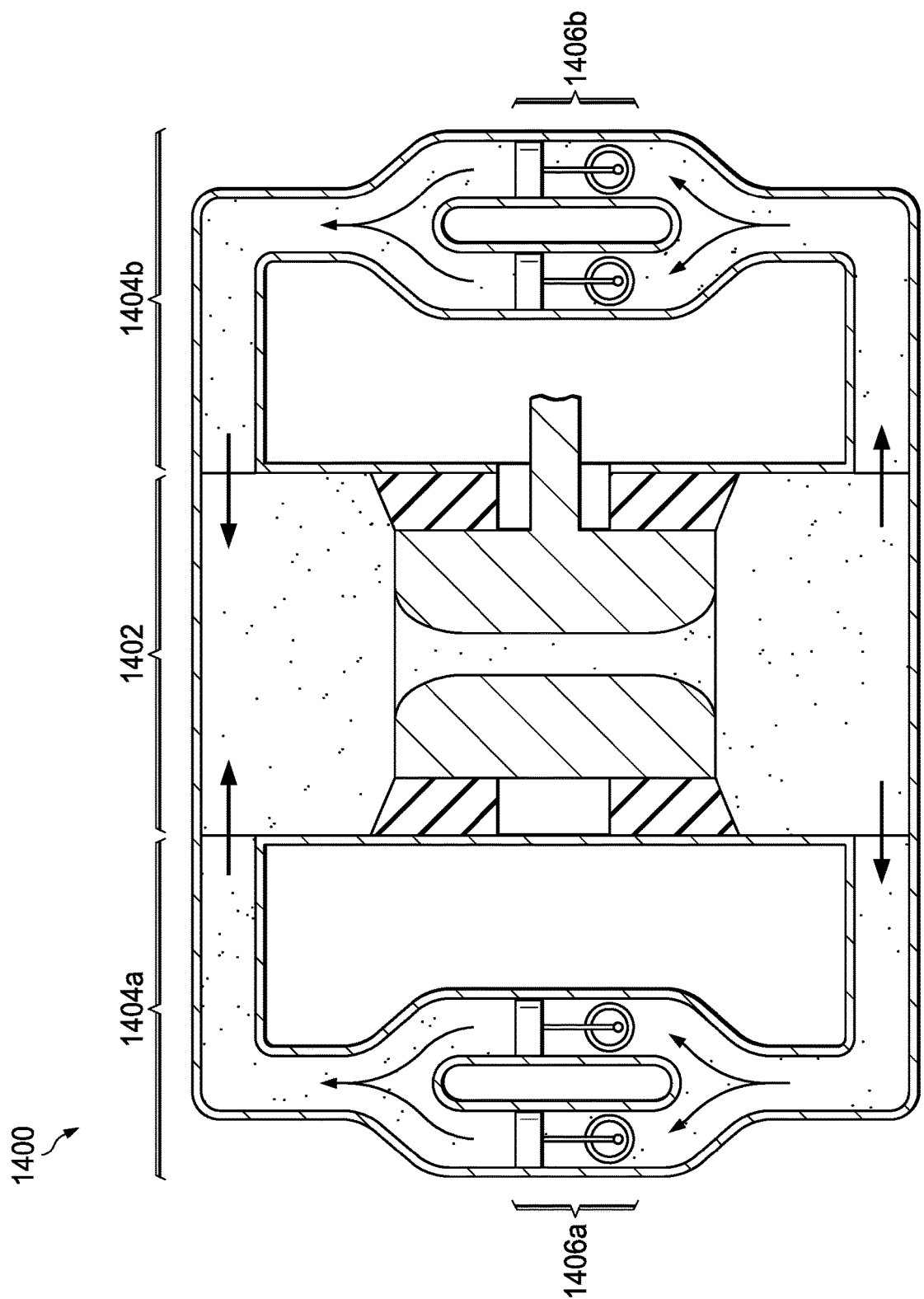
Figure 15:
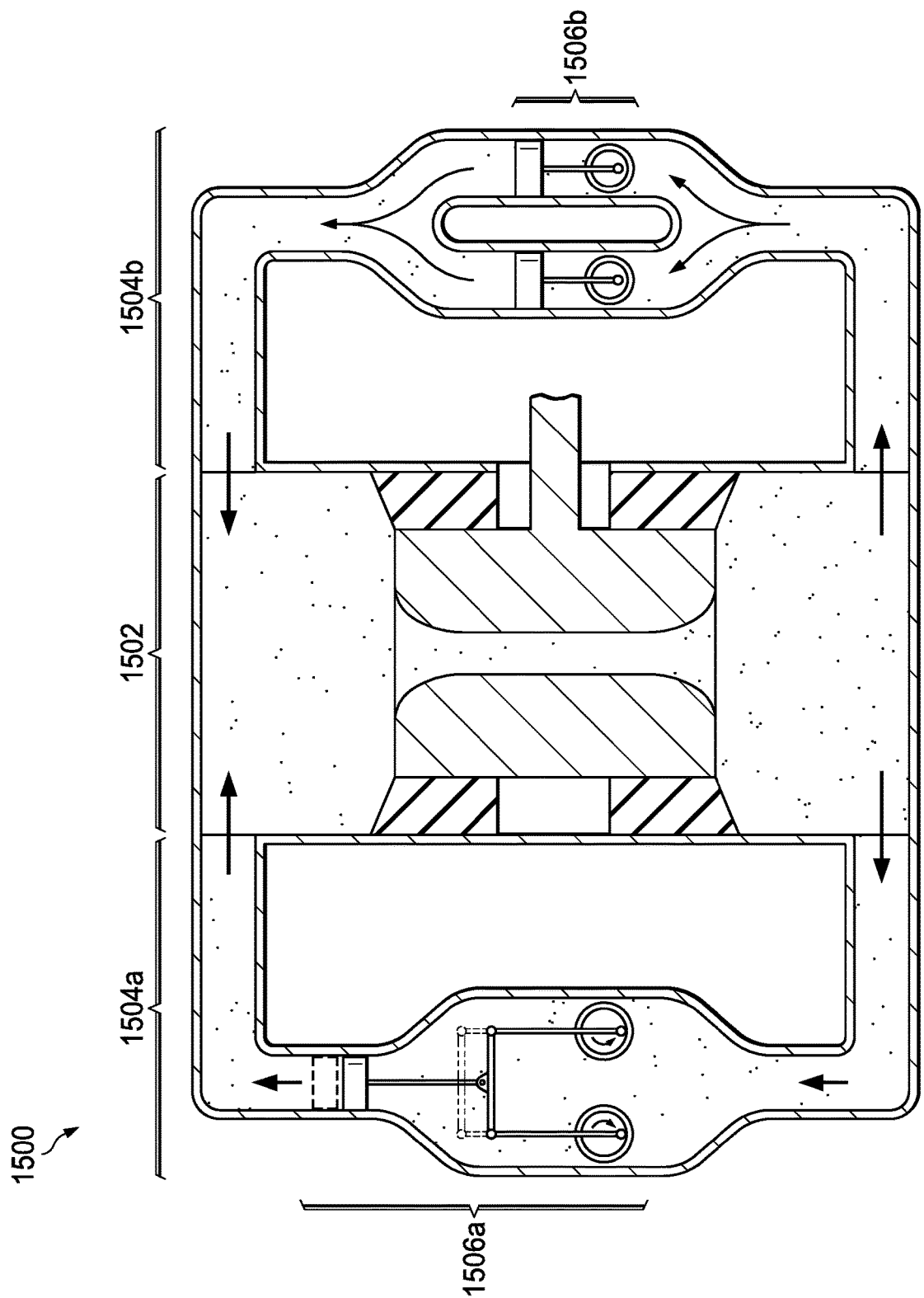
Figure 16:
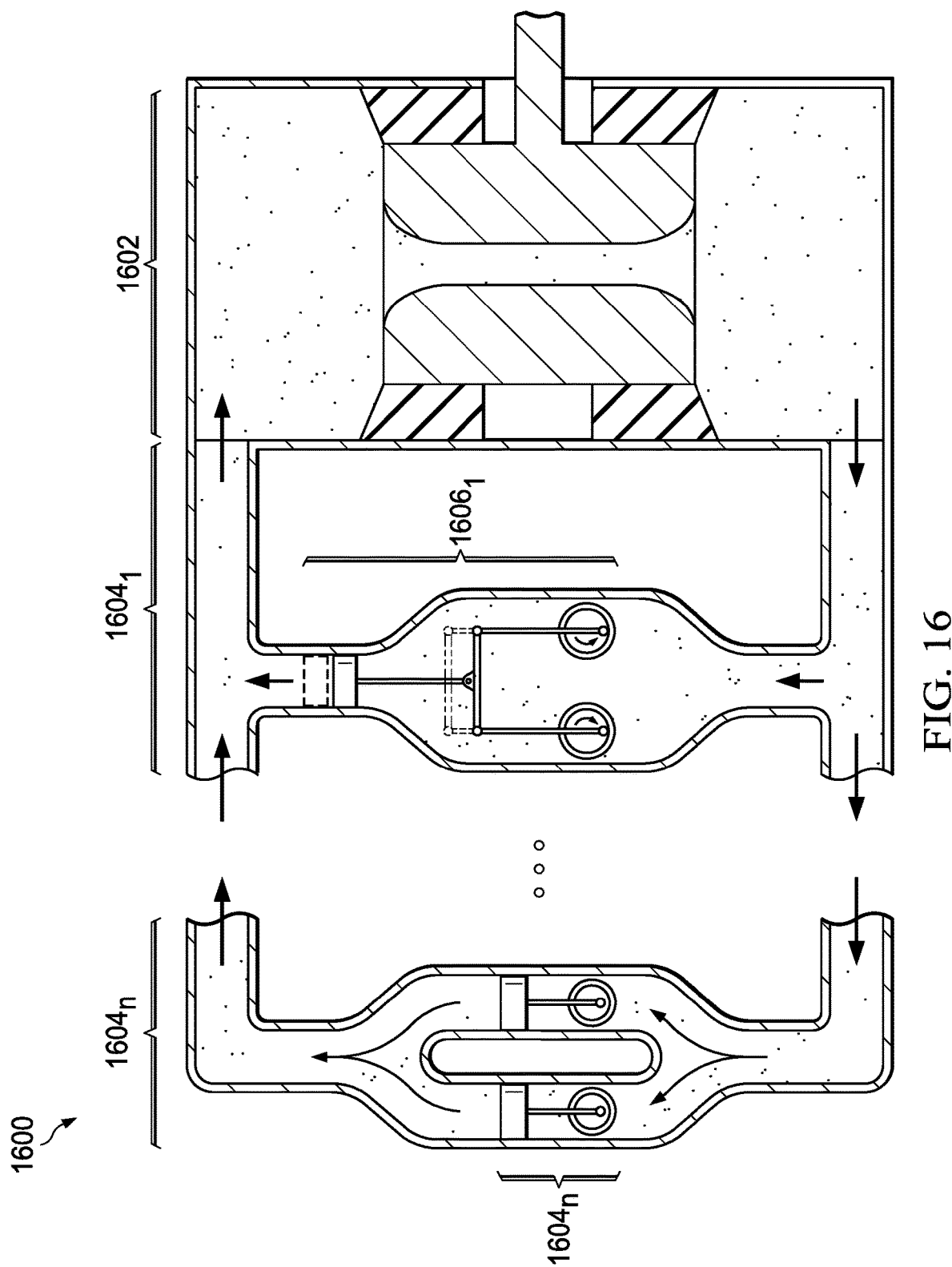

The vibration isolation systems described with respect to FIGS. 14, 15, and 16, may operate in a similar manner as the vibration isolation system 1300, e.g., with respect to relative phase angle of the multiple oscillatory pumping systems.

While, in FIG. 13, each of the oscillatory pumping systems 1306a and 1306b including two motors and one active piston, other configurations of oscillatory pumping systems are within the scope of the present disclosure such as those illustrated in FIGS. 14 and 15. FIG. 14 illustrates a vibration isolation system 1400, which includes a liquid inertia isolator 1402, an oscillatory pumping system 1406a disposed in a channel assembly 1404a, and an oscillatory pumping system 1406b disposed in a channel assembly 1404b. Each of the oscillatory pumping systems 1406a and 1406b includes two motors and two active pistons. In addition, each of the oscillatory pumping systems may operate as described with respect to FIGS. 5A, 5B, 5C, 7A, 7B, and 7C. FIG. 15 illustrates a vibration isolation system 1500, which includes a liquid inertia isolator 1502, an oscillatory pumping system 1506a disposed in a channel assembly 1504a, and an oscillatory pumping system 1506b disposed in a channel assembly 1504b. The oscillatory pumping system 1506a includes two motors and one active piston. The oscillatory pumping system 1506b includes two motors and two active pistons.

FIGS. 13, 14, 15, and 16 illustrate vibration isolation systems having multiple oscillatory pumping systems that operate in parallel with one another. In contrast, FIG. 16 illustrates a vibration isolation system 1600, which includes multiple oscillatory pumping systems that operate in series with one another. The vibration isolation system 1600 includes a liquid inertia isolator 1602, and a plurality of oscillatory pumping systems $1606_1, \ldots 1606_n$ disposed in a channel assemblies $1606_1, \ldots 1606_n$. Each of the oscillatory pumping systems $1606_1, \ldots 1606_n$ may operate as described herein.

Figure 17:
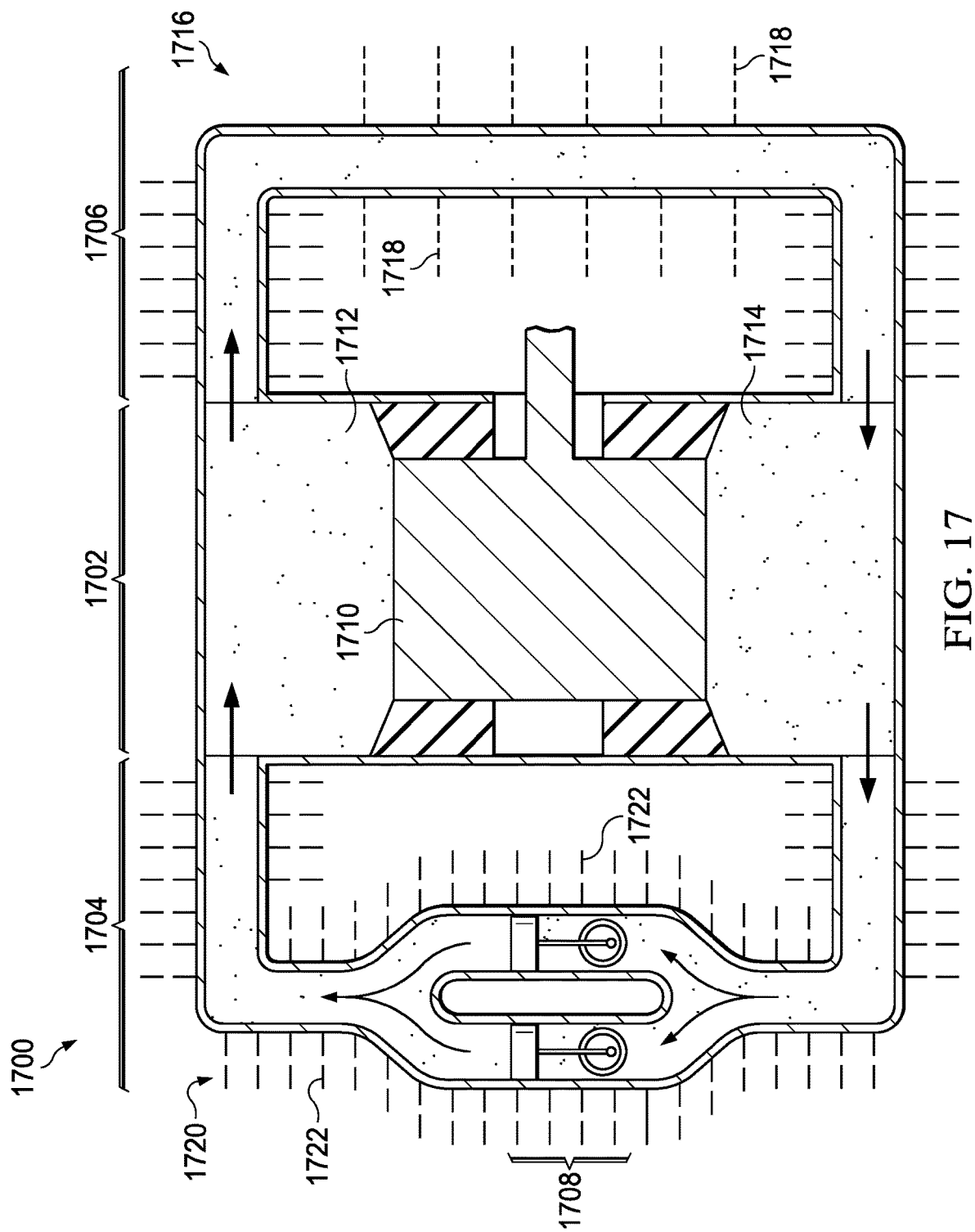
FIGS. 17 and 18 illustrate vibration isolation systems including various passages, in accordance with some embodiments of the present disclosure.
Figure 18:
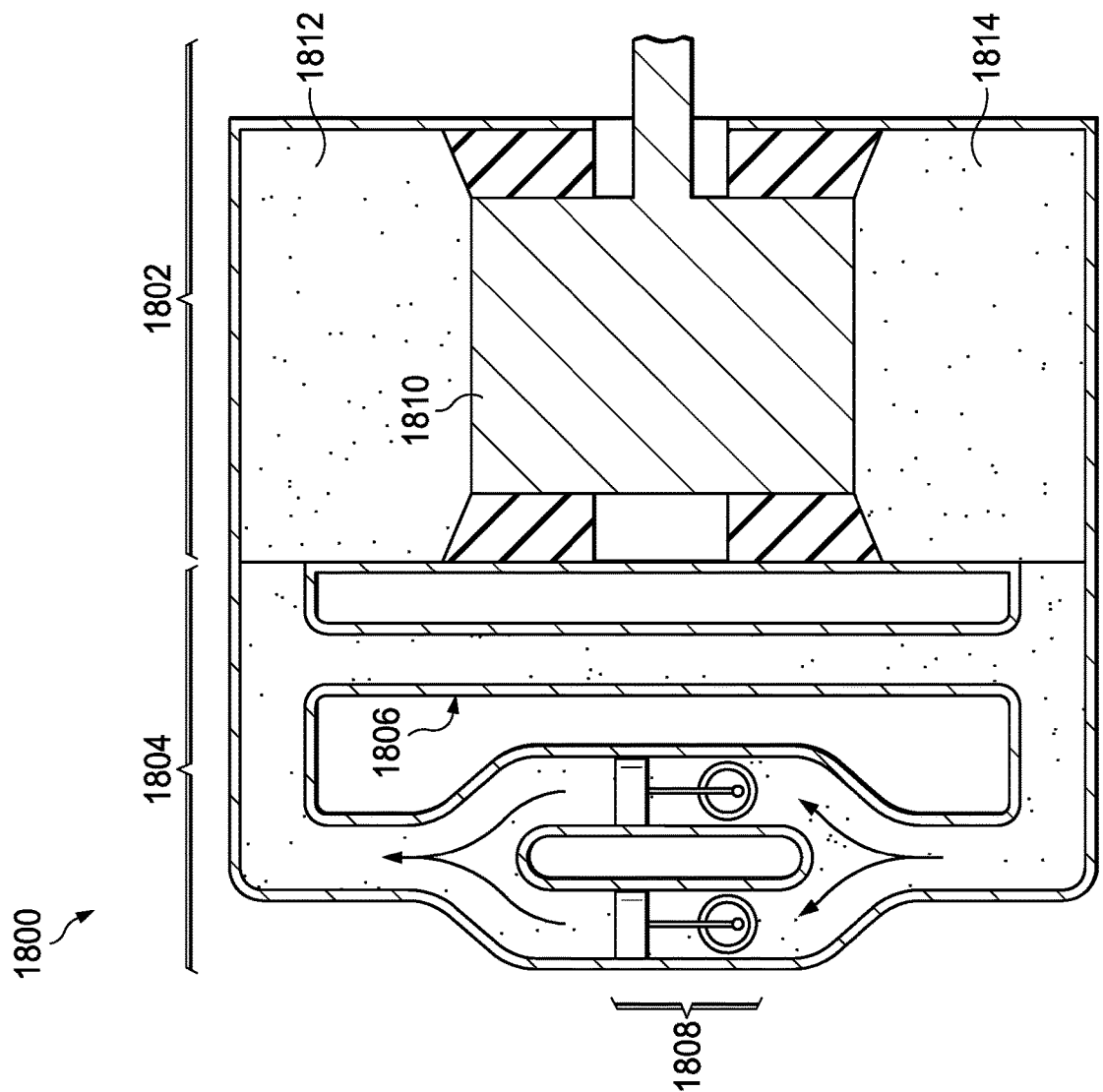

While some embodiments of the present disclosure include a passage that extends through a passive piston of a liquid inertia isolator, embodiments of the present disclosure are not limited to such. Indeed, a passage may fluidically couple fluid chambers outside of the passive piston and/or outside a housing of the liquid inertia isolator. For example, a channel may fluidically couple the fluid chambers between openings in a housing of a liquid inertia isolator and/or between portions of a channel assembly. FIGS. 17 and 18 illustrate vibration isolation systems including such passages, in accordance with some embodiments of the present disclosure. FIG. 17 illustrates a vibration isolation system 1700 including a passage that extends between openings in a housing of a liquid inertia isolator. The vibration isolation system 1700 includes a liquid inertia isolator 1702, an oscillatory pumping system 1708 disposed in a channel assembly 1704, and a channel 1706. The liquid inertia isolator 1702 includes a passive piston 1710, which lacks a passage to couple the fluids chambers 1712 and 1714. Instead, the channel 1706 provides a passage that fluidically couples the fluid chambers 1712 and 1714. The oscillatory pumping system 1708 includes a motor that is submerged in the fluid, which can increase a temperature of the fluid, e.g., due to the fluid absorbing heat from the motor. Some embodiments include a heat dissipation system 1716 and/or a heat dissipation system 1720 for dissipating heat energy from the fluid. The heat dissipation system 1716 includes a plurality of fins 1718. The heat dissipation system 1720 includes a plurality of fins 1722. Each of the plurality of fins 1718 and each of the plurality of fins 1722 is made of a thermally conductive material and is a thin disc wrapping around the channel 1706 and the channel assembly 1704, respectively. Convective heat transfer from the fluid to the plurality of fins 1718 dissipates heat energy from the fluid via the channel 1706 and the channel assembly 1704, respectively. Because the plurality of fins 1718 and 1722 are exposed to the ambient environment (e.g., air), they can dissipate the heat energy by convection and reject the heat energy to the environment. To further increase heat dissipation from the fluid, the heat dissipation systems 1716 and 1720 may include a fan to blow across the plurality of fins 1718 and/or 1722. It is noted that one or more heat dissipation system (e.g., 1716 and/or 1720) may be attached to and dissipate heat energy from any channel and/or channel assembly of the present disclosure. FIG. 18 illustrates a vibration isolation system 1800 including a passage that extends between portions of a channel assembly. The vibration isolation system 1800 includes a liquid inertia isolator 1802, an oscillatory pumping system 1808 disposed in a channel assembly 1804, and a channel 1806. The liquid inertia isolator 1802 includes a passive piston 1810, which lacks a passage to couple the fluids chambers 1812 and 1814. Instead, the channel 1806 provides a passage that fluidically couples the fluid chambers 1812 and 1814.

Figure 20:
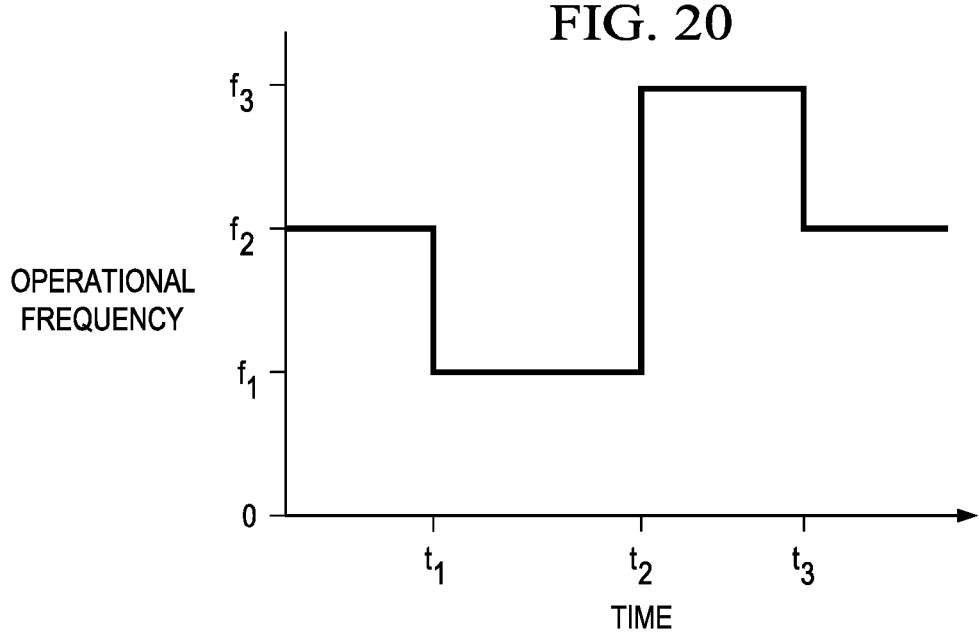
FIG. 20 illustrates a plot of operational frequency of an oscillatory pumping system that changes over time, in accordance with some embodiments of the present disclosure.

Oscillatory pumping systems are not limited to only operating at a single operational frequency. Some oscillatory pumping systems of the present disclosure may change operational frequency during it use. For example, the oscillatory pumping systems may actively change operational frequency based on detected (e.g., from a sensor data) that input frequencies produced by a rotor system have changed (e.g., based on an aircraft changing flight regimes such as moving from vertical takeoff to horizontal flight). FIG. 20 illustrates a plot of operational frequency of an oscillatory pumping system that changes over time. For example, the operational frequency remains constant at operational frequency $f_2$ from time 0 to time $t_1$ at which point it changes to operational frequency $f_1$. The operational frequency remains constant at operational frequency $f_1$ from time $t_1$ to time $t_2$ at which point it changes to operational frequency $f_3$. The operational frequency remains constant at operational frequency $f_3$ from time $t_2$ to time $t_3$ at which point it changes to operational frequency $f_2$.

Several embodiments of the present disclosure utilize a certain number of members, such as vibration isolation systems, oscillatory pumping systems, liquid inertia isolators, channel assemblies, main channels, branch channels, active piston, motors, controllers, rotor systems, and the like. However, embodiments of the present disclosure are not limited to the specific number of members in the illustrated embodiments. The number of members can vary between different embodiments. For example, some embodiments may be implemented using more, less, and/or other member than those illustrated in the Figures. Moreover, some embodiments may consolidate two or more of the members into a single member. In addition, several embodiments of the present disclosure refer to coupling and/or attachments. Such coupling and/or attachments are inclusive of screws, nuts, bolts, welds or any other mechanical fasteners for attaching two or more components to one another.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order. As another example, some embodiments of the present disclosure have been described with respect to inhibiting (and/or preventing) lubricant from passing between compartments within a drive system. However, it will be appreciated by those of skill in the art that embodiments of the present disclosure are not limited to lubricants and are equally applicable to any liquid that may be utilized in such a drive system. In addition, it will be appreciated by those of skill in the art that embodiments of the present disclosure are not limited to drive systems and are equally applicable to any system of an aircraft, or another vehicle, that relies on liquids for operation.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A vibration isolation system comprising:
a housing defining a cavity;
a fluid disposed in the cavity;

a passive piston disposed in the cavity and dividing the cavity into two fluid chambers, the passive piston having a frequency response operable to counteract a vibratory displacement of a vibrating object;
a channel fluidically coupling the two fluid chambers;
an active piston disposed in the channel; and
two motors coupled to the active piston, the two motors being operable to selectively change the frequency response of the passive piston based on oscillating the active piston;
wherein:
   the two motors are operable to oscillate out of phase with one another to oscillate the fluid in the channel and in the two fluid chambers based on oscillating the active piston, and
   the two motors are operable to oscillate in antiphase with one another to hold constant a position of the active piston;
wherein at least one of the two motors is submerged in and in direct contact with the fluid and the fluid cools the at least one of the two motors based on absorbing heat energy from the motor; and
wherein the vibration system further comprises a plurality of fins operable to dissipate the heat energy by convection.

2. The vibration isolation system of claim 1, further comprising: a passage fluidically coupling the two fluid chambers, wherein the active piston forces the fluid to move in a reciprocating motion between the two fluid chambers via the passage.

3. The vibration isolation system of claim 1, wherein the active piston obstructs the channel.

4. The vibration isolation system of claim 1, further comprising:
two static seals to seal between the two motors and corresponding orifices in the channel.

5. The vibration isolation system of claim 1, wherein the channel comprises:
a main channel; and
two branch channels coupled to the main channel.

6. The vibration isolation system of claim 1, wherein the housing is coupled to an airframe and the passive piston is coupled to a rotor system.

7. An aircraft comprising:
a rotor system operable to generate a vibratory displacement;
an airframe;
a vibration isolation system coupled to the rotor system and the airframe, the vibration isolation system comprising:
   a housing defining a cavity;
   a fluid disposed in the cavity;
   a passive piston disposed in the cavity and dividing the cavity into two fluid chambers, the passive piston having a frequency response operable to counteract the vibratory displacement;
   a channel fluidically coupling the two fluid chambers;
   one or more active piston disposed in the channel; and
   two motors coupled to the one or more active piston, the two motors being operable to selectively change the frequency response of the passive piston based on oscillating the one or more active piston;
wherein the fluid comprises a fluorocarbon oil.

8. The aircraft of claim 7, further comprising a passage fluidically coupling the two fluid chambers, wherein each of the one or more active piston forces the fluid to move in a reciprocating motion between the two fluid chambers via the passage.

9. The aircraft of claim 7, wherein the one or more active piston comprises only a single active piston; and wherein:
   the two motors are operable to oscillate out of phase with one another to oscillate the fluid in the channel and in the two fluid chambers based on oscillating the single active piston, and
   the two motors are operable to oscillate in antiphase with one another to hold constant a position of the single active piston.

10. The aircraft of claim 7, wherein the one or more active piston comprises two active pistons; and wherein:
   the two active pistons are operable to oscillate out of phase with one another to oscillate the fluid in the channel and in the two fluid chambers; and
   the two active pistons are operable to oscillate in antiphase with one another to oscillate only the fluid in the channel and not in the two fluid chambers.

11. An oscillatory pumping system comprising:
one or more active piston disposed in a channel fluidically coupling two fluid chambers, the passive piston having a frequency response operable to counteract a vibratory displacement;
a fluid disposed in the channel and the two fluid chambers; and
two motors coupled to the one or more active piston, the two motors being operable to selectively change the frequency response of the passive piston based on oscillating the one or more active piston;
wherein at least one of the two motors is submerged in and in direct contact with the fluid and the fluid cools the at least one of the two motors based on absorbing heat energy from the motor, the oscillatory pumping system further comprising a plurality of fins operable to dissipate the heat energy by convection.

12. The oscillatory pumping system of claim 11, wherein a passage fluidically couples the two fluid chambers and the one or more active piston forces the fluid to move in a reciprocating motion between the two fluid chambers via the passage.

13. The oscillatory pumping system of claim 11, wherein the one or more active piston comprises only a single active piston; and wherein:
   the two motors are operable to oscillate out of phase with one another to oscillate the fluid in the channel and in the two fluid chambers based on oscillating the single active piston, and
   the two motors are operable to oscillate in antiphase with one another to hold constant a position of the single active piston.

14. The oscillatory pumping system of claim 11, wherein the one or more active piston comprises two active pistons; and wherein:
   the two active pistons are operable to oscillate out of phase with one another to oscillate the fluid in the channel and in the two fluid chambers; and
the two active pistons are operable to oscillate in antiphase with one another to oscillate only the fluid in the channel and not in the two fluid chambers.

* * * * *